United States Patent
Shim et al.

(10) Patent No.: US 9,495,066 B2
(45) Date of Patent: Nov. 15, 2016

(54) METHOD FOR PROVIDING GUI USING MOTION AND DISPLAY APPARATUS APPLYING THE SAME

(75) Inventors: Jung-hyun Shim, Gyeonggi-do (KR); Yong-gook Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 12/900,182

(22) Filed: Oct. 7, 2010

(65) Prior Publication Data

US 2011/0083103 A1  Apr. 7, 2011

(30) Foreign Application Priority Data

Oct. 7, 2009 (KR) .................. 10-2009-0095189

(51) Int. Cl.
| G06F 3/0481 | (2013.01) |
|---|---|
| G06F 3/0482 | (2013.01) |
| G06F 1/16 | (2006.01) |

(52) U.S. Cl.
CPC ......... *G06F 3/04815* (2013.01); *G06F 1/1694* (2013.01); *G06F 3/0482* (2013.01); *G06F 2200/1614* (2013.01); *G06F 2200/1637* (2013.01); *G06F 2203/04802* (2013.01)

(58) Field of Classification Search
CPC .. G06F 1/1626; G06F 1/1684; G06F 1/1694; G06F 3/0481; G06F 3/0482; G06F 3/0485; G06F 17/30873; G06F 17/30994; G06F 2200/1637
USPC ....... 715/810, 757, 763, 778, 848, 863, 864; 345/158, 173, 184
See application file for complete search history.

(56) References Cited

U.S. PATENT DOCUMENTS

| 6,005,579 | A | 12/1999 | Sugiyama et al. |
|---|---|---|---|
| 6,043,818 | A | 3/2000 | Nakano et al. |
| 8,044,933 | B2 | 10/2011 | Hong et al. |
| 8,253,761 | B2 | 8/2012 | Kim et al. |
| 2002/0010718 | A1* | 1/2002 | Miller .......................... 707/526 |
| 2003/0156146 | A1 | 8/2003 | Suomela et al. |
| 2004/0100441 | A1 | 5/2004 | Rekimoto et al. |
| 2005/0010876 | A1* | 1/2005 | Robertson et al. ........... 715/782 |

(Continued)

FOREIGN PATENT DOCUMENTS

| CN | 1925658 A | 3/2007 |
|---|---|---|
| CN | 1955901 A | 5/2007 |

(Continued)

OTHER PUBLICATIONS

Machine translation of KR 10-2009-0070050 published Jul. 1, 2009, Inventor: Kim, Pil-Sang.*

(Continued)

*Primary Examiner* — Alvin Tan
*Assistant Examiner* — Rinna Yi
(74) *Attorney, Agent, or Firm* — Sughrue Mion, PLLC

(57) ABSTRACT

A method for providing a Graphic User Interface (GUI) and a display apparatus applying the same are provided. According to the method, a screen on a specific face is displayed on a Three Dimensional (3D) GUI, and if a user's manipulation is inputted when the screen of the specific face is displayed, a screen of at least one of adjoining face that corresponds to a direction of the user's manipulation, is displayed. As a result, a user is able to select a desired menu with increased ease and convenience.

19 Claims, 48 Drawing Sheets

(56) References Cited

U.S. PATENT DOCUMENTS

| | | | |
|---|---|---|---|
| 2006/0020898 A1 | 1/2006 | Kim et al. | |
| 2007/0046630 A1* | 3/2007 | Hong et al. | 345/158 |
| 2007/0097114 A1 | 5/2007 | Kim et al. | |
| 2008/0059893 A1* | 3/2008 | Byrne et al. | 715/757 |
| 2009/0237372 A1 | 9/2009 | Kim et al. | |
| 2009/0265627 A1* | 10/2009 | Kim et al. | 715/702 |
| 2010/0125816 A1* | 5/2010 | Bezos | 715/863 |
| 2010/0131904 A1* | 5/2010 | Fong et al. | 715/863 |
| 2010/0138766 A1* | 6/2010 | Nakajima | 715/767 |
| 2011/0161884 A1* | 6/2011 | Dugan et al. | 715/843 |

FOREIGN PATENT DOCUMENTS

| | | |
|---|---|---|
| CN | 101387937 A | 3/2009 |
| CN | 101452366 A | 6/2009 |
| CN | 101488073 A | 7/2009 |
| EP | 1667471 A1 | 6/2006 |
| EP | 1764671 A2 | 3/2007 |
| KR | 1020030068581 | 8/2003 |
| KR | 1020040026549 | 3/2004 |
| KR | 1020040051202 | 6/2004 |
| KR | 10-0630154 B1 | 10/2006 |
| KR | 1020080064025 | 7/2008 |
| KR | 1020090070050 | 7/2009 |
| WO | 2005/091122 A2 | 9/2005 |

OTHER PUBLICATIONS

Machine translation of KR 10-2008-0064025 published Jul. 8, 2008 Inventor: Kim, Mi-Ok.*

KR 10-2009-0070050 ENG MT specification (publised in Jul. 1, 2009) KR 10-2009-0070050 ENG MT claims and drawings (publised in Jul. 1, 2009).*

Communication, dated Mar. 4, 2014, issued by the State Intellectual Property Office of P.R. China in counterpart Chinese Patent Application No. 201080045091.0.

Communication dated Dec. 15, 2014, issued by the State Intellectual Property Office in counterpart Chinese Application No. 201080045091.0.

Communication dated Jul. 24, 2015 issued by the State Intellectual Property Office of P.R. China in counterpart Chinese Patent Application No. 201080045091.0.

Communication dated Nov. 18, 2015, issued by the Korean Intellectual Property Office in counterpart Korean Application No. 10-2009-0095189.

Communication dated Dec. 4, 2015, issued by the European Patent Office in counterpart European Application No. 10822246.4.

Communication from the State Intellectual Property Office of P.R. China dated Apr. 8, 2016 in counterpart Chinese application No. 201080045091.0.

Communication dated Jul. 27, 2016, issued by the Korean Intellectual Property Office in counterpart Korean Patent Application No. 10-2009-0095189.

* cited by examiner

NO SLANTING

— NO SLANTING

– NO SLANTING

– NO SLANTING

- NO SLANTING

NO SLANTING

METHOD FOR PROVIDING GUI USING MOTION AND DISPLAY APPARATUS APPLYING THE SAME

PRIORITY

This application claims priority under 35 U.S.C. §119(a) to Korean Patent Application No. 10-2009-0095189, filed on Oct. 7, 2009 in the Korean Intellectual Property Office, the contents of which are incorporated herein by reference.

BACKGROUND OF THE INVENTION

1. Field of the Invention

The present invention relates generally to a method for providing a Graphic User Interface (GUI) and a display apparatus applying the same, and more particularly, to a method for providing a GUI which displays a menu according to a detected motion and a display apparatus applying the same.

2. Description of the Related Art

Due to a continued advancement of mobile technologies, many more mobile devices with displays are available for use. In addition, display apparatuses are now capable of providing a variety of functions. For example, a complex multimedia device integrating therein functions of a Motion Pictures Experts Group (MPEG) Layer Audio 3 (MP3) player, camera and mobile phone are in high demand.

GUI technology has also been developed to keep pace with the diversification of display apparatuses, and to enable simple use of the provided functions. Sensors are particularly developed to receive various user manipulations and to enable the users to input instructions in a preferred manner, such as by touching a screen or by motion sense.

As such, GUIs provide graphics on a screen and are rapidly replacing the conventional button-based User Interfaces (UIs). Accordingly, there is a need for a method to provide a GUI, with which users can easily use a menu on the functions of the display apparatuses.

SUMMARY OF THE INVENTION

The present invention has been made to address at least the above problems and/or disadvantages and to provide at least the advantages described below. Accordingly, an aspect of the present invention provides a method for providing a GUI which displays a screen of a specific face on a three dimensional (3D) GUI, and if a user's manipulation is inputted when the screen of the specific face is displayed, displays the screen of at least one of the adjoining faces corresponding to the direction of the user's manipulation, and a display apparatus applying the same.

According to the present invention, a method for providing a GUI of a display apparatus includes generating a 3D GUI constructed to display separate screens on a specific face and at least one adjoining faces contacting an edge of the specific face, displaying the screen of the specific face, and if a user manipulation is inputted in a state that the screen of the specific face is displayed, displaying the screen of the at least one adjoining face that corresponds to a direction of the user's manipulation.

The user's manipulation includes a slanting motion by which the display apparatus is slanted in a specific direction, and displaying the screen of at least one face includes displaying the screen of at least one of the upward, downward, leftward and rightward faces that corresponds to the direction of the slanting, according to a direction of the manipulation by the slanting motion.

The displaying the screen of the at least one face comprises displaying the 3D GUI at an inclination in the direction of the slanting, to display the screen of at least one of the upward, downward, leftward and rightward faces that corresponds to the direction of the slanting.

The displaying the screen of the at least one face includes inputting a start manipulation, indicating an initiation of a manipulation by slanting motion, detecting for the slanting motion of the display apparatus, and displaying a screen of at least one of the upward, downward, leftward and rightward faces that corresponds to the direction of the slanting, according to the direction of slanting motion as detected.

The displaying the screen of the at least one face includes displaying a screen of one of the upward, downward, leftward and rightward faces that corresponds to the direction of the slanting, if a manipulation by the slanting motion is inputted in one of upward, downward, leftward and rightward directions with reference to a screen of the display apparatus.

The displaying the screen on the at least one face includes displaying screens of two of the upward, downward, leftward and rightward faces that correspond to the direction of the slanting, if a manipulation by the slanting motion is inputted in one of diagonal directions including left-upward, left-downward, left-downward and right-downward directions with reference to a screen of the display apparatus.

According to the present invention, a display apparatus includes a GUI generating unit which generates a 3D GUI constructed to display separate screens on a specific face and at least one adjoining faces contacting an edge of the specific face, a display unit which displays the 3D GUI, and a control unit which controls so that, if a user manipulation is inputted in a state that the screen of the specific face is displayed, the screen of the at least one adjoining face that corresponds to a direction of the user's manipulation is displayed.

The specific face is one face of a rectangular parallelepiped, and the at least one adjoining face is an upward face, a downward face, a leftward face, and a rightward face which adjoin four edges of the specific face.

The display apparatus additionally includes a motion detecting unit which detects a motion of the display apparatus, and the user's manipulation includes a slanting motion by which the display apparatus is slanted in a specific direction, and the control unit controls so that the screen of at least one of the upward, downward, leftward and rightward faces that corresponds to the direction of the slanting is displayed, according to a direction of the manipulation by the slanting motion.

The control unit controls so that, if a start manipulation is inputted, indicating an initiation of a manipulation by slanting motion, according to the direction of the slanting motion as detected by the motion detecting unit, a screen of at least one of the upward, downward, leftward and rightward faces that corresponds to the direction of the slanting is displayed.

The control controls so that, a screen of one of the upward, downward, leftward and rightward faces that corresponds to the direction of the slanting is displayed, if a manipulation by the slanting motion is inputted in one of upward, downward, leftward and rightward directions with reference to a screen of the display apparatus.

The control unit controls so that the screens of two of the upward, downward, leftward and rightward faces that correspond to the direction of the slanting, are displayed, if a manipulation by the slanting motion is inputted in one of diagonal directions including left-upward, left-downward, left-downward and right-downward directions with reference to a screen of the display apparatus.

The separate screens of the specific face and the at least one adjoining face contacting an edge of the specific face, include at least one of a menu screen, a content playback screen, and an application executing screen.

According to an embodiment of the present invention, a method for providing a GUI of a display apparatus which is capable of detecting a motion, includes inputting a manipulation by slanting motion with respect to the display apparatus, and displaying a menu on at least one of upward, downward, leftward and rightward sides of a screen that corresponds to a direction of the manipulation by slanting motion, if the manipulation by slanting motion is inputted.

According to the present invention, a screen on a specific face is displayed on a 3D GUI, and if a user's manipulation is inputted in a state that the screen of the specific face is displayed, a screen of at least one of adjoining face that corresponds to a direction of the user's manipulation, is displayed. As a result, user is able to select a desired menu with increased ease and convenience.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
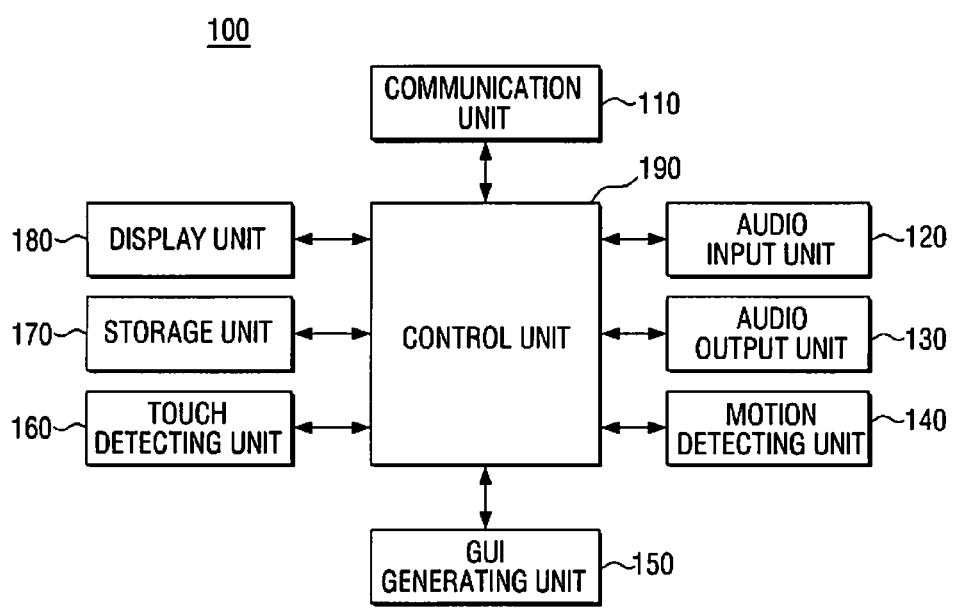
FIG. 1 illustrates a mobile phone according to an embodiment of the present invention.

Embodiments of the present invention are described in detail with reference to the accompanying drawings. In the following description, the same or similar reference numerals may be used for the same or similar elements when they are illustrated in different drawings. Detailed descriptions of constructions or processes known in the art may be omitted for the sake of clarity and conciseness.

FIG. 1 illustrates a mobile phone 100 according to an embodiment of the present invention. Referring to FIG. 1, the mobile phone 100 includes a communication unit 110, an audio input unit 120, an audio output unit 130, a motion detecting unit 140, a GUI generating unit 150, a touch detecting unit 160, a storage unit 170, a display unit 180, and a control unit 190.

The communication unit 110 is connected to access an external device, such as the TV 100 (or mobile phone) via a mobile communication network, a wireless communication network, or the Internet. The mobile communication network herein may include the Global System for Mobile Communications (GSM) network, or Wideband Code Division Multiple Access (WCDMA) network. The wireless communication network is connected, for example, by Bluetooth® or Zigbee®. The Internet is connected, for example, over the wireless Local Area Network (LAN).

The audio input unit 120 receives user voice input and converts the user's voice into audio data consisting of electric signals, and transmits the converted audio data to the control unit 190.

The audio output unit 130 outputs the audio signal received from the control unit 190 through a speaker or the like.

The motion detecting unit 140 detects movements of the mobile phone 100, such as a manipulation by slanting motion of the mobile phone 10. The 'slanting motion' herein refers to a slanting of the mobile phone 100 with reference to a predetermined plane. The motion detecting unit 140 detects the angle and the direction of slanting as the information on the manipulation by slanting motion. The angle of slanting herein refers to the angle between a predetermined face and the mobile phone 100. The direction of slanting herein refers to a direction to which the mobile phone 100 is slanted. Specifically, the direction of slanting may include one of upward, downward, leftward, rightward, left-up, left-down, right-up and right-down directions.

The motion detecting unit 140 may be implemented as an acceleration sensor or a gyro sensor. The motion detecting unit 140 transmits the information regarding the detected manipulation by slanting motion to the control unit 190.

The GUI generating unit 150 generates GUI to receive a user command. The GUI generating unit 150 generates a 3D GUI to display menus on a specific face and at least one face adjoining the edge of the specific face, respectively. That is, the GUI generating unit 150 generates 3D GUI based on five faces of a rectangular parallelepiped.

The 3D GUI herein displays menus on upward, downward, leftward and rightward faces each adjoining a specific face and edge adjoining the four edges of the specific face of the rectangular parallelepiped. The specific face is a bottom face of the rectangular parallelepiped, which has the same size as that of the screen of the mobile phone 100. Additionally, the specific face corresponds to an area on which the GUI menu is displayed. The upward, downward, leftward and rightward faces may display upper or lower menus of the menu displayed on the specific face, and also display icons which work as the shortcuts to the functions provided by the mobile phone 100.

As explained above, the GUI generating unit 150 generates the 3D GUI on which menus are displayed on a specific face and the adjoining faces, and transmits the generated GUI to the control unit 190.

The touch detecting unit 160 detects information on user's manipulation by touch. Specifically, the touch detecting unit 160 may be implemented as a touch screen to detect the user's manipulation by touch with respect to the display screen. The touch detecting unit 160 transmits the detected information regarding the user's manipulation by touch to the control unit 190.

The storage unit 170 stores therein programs to execute respective functions of the mobile phone 100. The storage unit 170 may be implemented, for example, as a hard disk or non-volatile memory.

The display unit 180 displays an image to provide the functions of the mobile phone 100, and displays GUI for manipulation of the user on the screen. Specifically, the display unit 180 displays the 3D GUI, in which the menus are displayed on the specific face and adjoining faces, according to the user's manipulation.

The control unit 190 controls the overall operation of the mobile phone 100. The control unit 190 controls in response to the user's manipulation inputted when the menu on the specific face is displayed, so that the menu on at least one side surface that corresponds to the direction of the user's manipulation is displayed on the screen. That is, if the user's manipulation is inputted when the menu on the specific face is displayed, the control unit 190 controls so that the menu on at least one face that corresponds to the direction of the user's manipulation is displayed on the screen.

If the user's manipulation corresponds to the manipulation by slanting motion of the mobile phone 100, the control unit 190 controls so that the menu on at least one of the upward, downward, leftward and rightward faces that corresponds to the direction of slanting, is displayed. The control unit 190 controls so that the 3D GUI is slanted in the direction of slanting to thereby display the menu on at least one of the upward, downward, leftward and rightward faces that corresponds to the direction of slanting.

The angle of slanting by the 3D GUI is in proportion to the angle of slanting by the mobile phone 100. Accordingly, the control unit 190 provides the user with an effect as if the 3D GUI is physically slanted.

If a start manipulation to initiate the manipulation by slanting is inputted, the control unit 190 may control so that the menu on at least one of the upward, downward, leftward and rightward faces that corresponds to the direction of slanting is displayed according to the direction of slanting. The 'start manipulation' is the reference of the manipulation by slanting. That is, the face of the mobile phone 100 at the time of input of the start manipulation becomes the reference plane (i.e., 0 degree) of the manipulation by slanting. The start manipulation may include pressing on a specific button on the mobile phone 100, or touching of a specific icon.

If a manipulation by slanting is inputted to one of upward, downward, leftward or rightward directions with respect to the screen of the mobile phone 100, the control unit 190 controls so that the menu on one of the upward, downward, leftward and rightward faces that corresponds to the direction of slanting is displayed. Specifically, if a manipulation by slanting is inputted in the upward direction with respect to the screen, the control unit 190 controls so that the menu on the upward face is displayed. If a manipulation by slanting is inputted in the downward direction with respect to the screen, the control unit 190 controls so that the menu on the downward face is displayed. If a manipulation by slanting is inputted in the leftward direction with respect to the screen, the control unit 190 controls so that the menu on the leftward face is displayed. If a manipulation by slanting is inputted in the rightward direction with respect to the screen, the control unit 190 controls so that the menu on the rightward face is displayed.

Furthermore, if the manipulation by slanting is inputted in one of left-upward, left-downward, right-upward, and right-downward directions which are diagonal with respect to the screen of the mobile phone 100, the control unit 190 controls so that the menus on two faces that correspond to the direction of slanting are controlled. Specifically, if the manipulation by slanting is inputted in the left-upward direction with respect to the screen, the control unit controls so that the menus on the leftward and upward faces are displayed. If the manipulation by slanting is inputted in the left-downward direction with respect to the screen, the control unit controls so that the menus on the leftward and downward faces are displayed. If the manipulation by slanting is inputted in the right-upward direction with respect to the screen, the control unit controls so that the menus on the leftward and upward faces are displayed. If the manipulation by slanting is inputted in the right-downward direction with respect to the screen, the control unit controls so that the menus on the rightward and downward faces are displayed.

As explained above, the mobile phone 100 displays the 3D GUI with menus on the specific face and the adjoining faces, and controls the 3D GUI according to the manipulation by slanting. Accordingly, the user is able to see new menus by simply slanting the mobile phone 100, and use otherwise complicated menus with increased ease.

Figure 2:
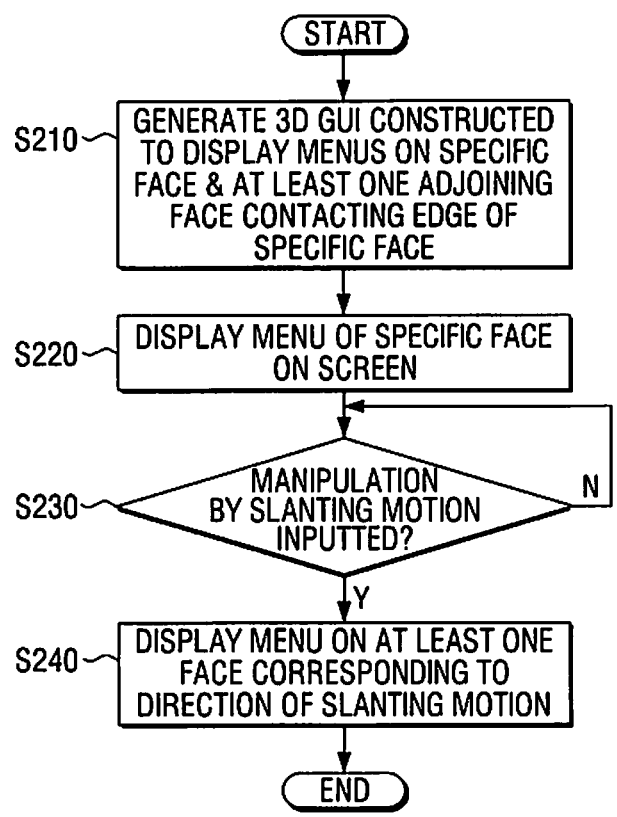
FIG. 2 is a flowchart of a method for providing a 3D GUI according to an embodiment of the present invention.

FIG. 2 is a flowchart of a method for providing a 3D GUI according to an embodiment of the present invention.

At S210, the mobile phone 100 generates a 3D GUI with menus displayed on a specific face and at least one face adjoining the specific face. Specifically, the mobile phone 100 generates the 3D GUI established based on five faces of a rectangular parallelepiped. The 3D GUI includes the menus displayed on the specific face and upward, downward, leftward and rightward faces that adjoin the four edges of the specific face, which may be the bottom face of the parallelepiped having the same size as that of the mobile phone screen. The specific face may be the area to display the general GUI menu. Compared to the specific face, the upward, downward, leftward, and rightward faces may display upper or lower menus with respect to the menus on the specific face, or display icons of the shortcuts to the functions provided by the mobile phone 100.

At S220, the mobile phone 100 displays the menu on the specific face on the screen. At S230-Y, if a user inputs a manipulation by slanting in a state that the menu on the specific face is displayed, at S240, the mobile phone 100 displays the menu on at least one face that corresponds to the direction of the manipulation by slanting. In order to display the menu on at least one of the upward, downward, leftward and rightward directions that corresponds to the direction of slanting, the 3D GUI is slanted to the direction of slanting.

The angle of slanting by the 3D GUI is in proportion to the angle of slanting by the mobile phone 100. Accordingly, the control unit 190 provides an effect as if the 3D GUI is physically slanted.

Furthermore, if a start manipulation is inputted to initiate the manipulation by slanting, the mobile phone 100 starts detecting for the slanting motion and may display the menu on at least one of the upward, downward, leftward and rightward faces that corresponds to the direction of slanting. The start manipulation is the reference of manipulation. That is, the face of the mobile phone 100 at the time of input of the start manipulation becomes the reference plane (i.e., 0 degree) of the manipulation by slanting. The start manipulation may include pressing on a specific button on the mobile phone 100, or touching of a specific icon.

If a manipulation by slanting is inputted to one of upward, downward, leftward or rightward directions with respect to the screen of the mobile phone 100, the control unit 190 controls so that the menu on one of the upward, downward, leftward and rightward faces that corresponds to the direction of slanting is displayed. Specifically, if a manipulation by slanting is inputted in the upward direction with respect to the screen, the control unit 190 controls so that the menu on the upward face is displayed. If a manipulation by slanting is inputted in the downward direction with respect to the screen, the control unit 190 controls so that the menu on the downward face is displayed. If a manipulation by slanting is inputted in the leftward direction with respect to the screen, the control unit 190 controls so that the menu on the leftward face is displayed. If a manipulation by slanting is inputted in the rightward direction with respect to the screen, the control unit 190 controls so that the menu on the rightward face is displayed.

Furthermore, if the manipulation by slanting is inputted in one of left-upward, left-downward, right-upward, and right-downward directions which are diagonal with respect to the screen of the mobile phone 100, the control unit 190 controls so that the menus on two faces that correspond to the direction of slanting are controlled. Specifically, if the manipulation by slanting is inputted in the left-upward direction with respect to the screen, the control unit controls so that the menus on the leftward and upward faces are displayed. If the manipulation by slanting is inputted in the left-downward direction with respect to the screen, the control unit controls so that the menus on the leftward and downward faces are displayed. If the manipulation by slanting is inputted in the right-upward direction with respect to the screen, the control unit controls so that the menus on the rightward and upward faces are displayed. If the manipulation by slanting is inputted in the right-downward direction with respect to the screen, the control unit controls so that the menus on the rightward and downward faces are displayed.

By the processing explained above, the mobile phone 100 displays the 3D GUI with menus on the specific face and the adjoining faces, and controls the 3D GUI according to the manipulation by slanting. Accordingly, the user is able to see new menus by simply slanting the mobile phone 100, and use otherwise complicated menus with increased ease.

Figure 3A:
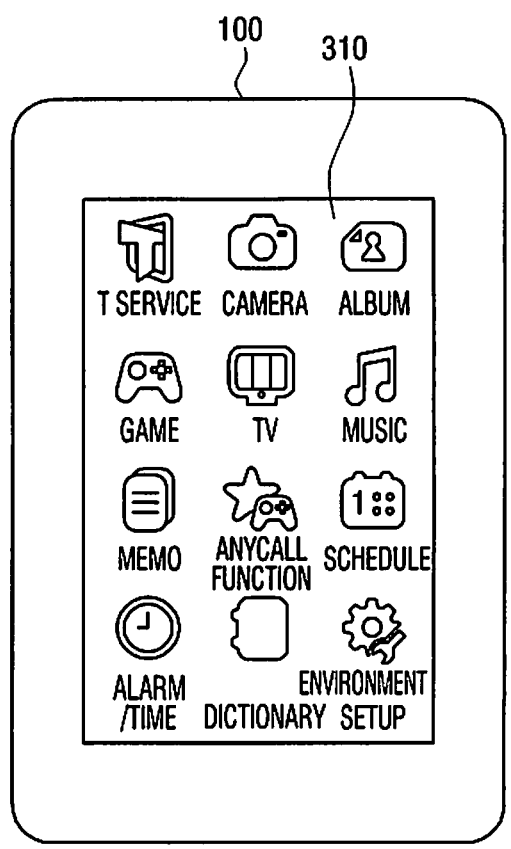
FIGS. 3A to 3C illustrate the process of displaying a menu on the leftward face according to an embodiment of the present invention.

FIGS. 3A to 3D illustrate a process of displaying a menu on the leftward face when the specific face 310 of the 3D GUI is displayed on the screen, according to the present invention. Referring to FIG. 3A, the specific face 310 of the 3D GUI includes the GUI screen generally displayed on the mobile phone 100 when there is no slanting of the mobile phone 100.

Figure 3B:
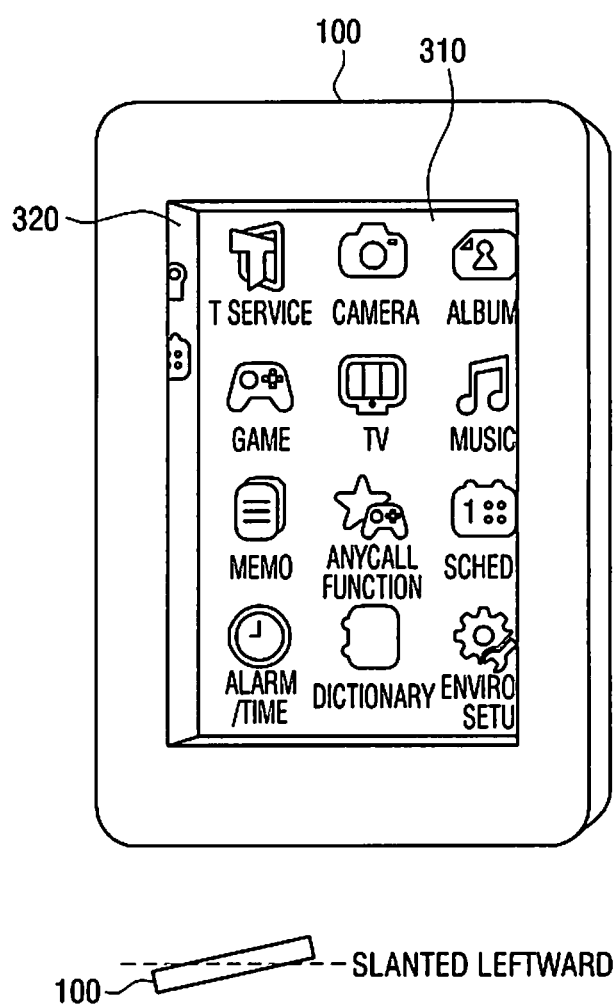
Figure 3C:
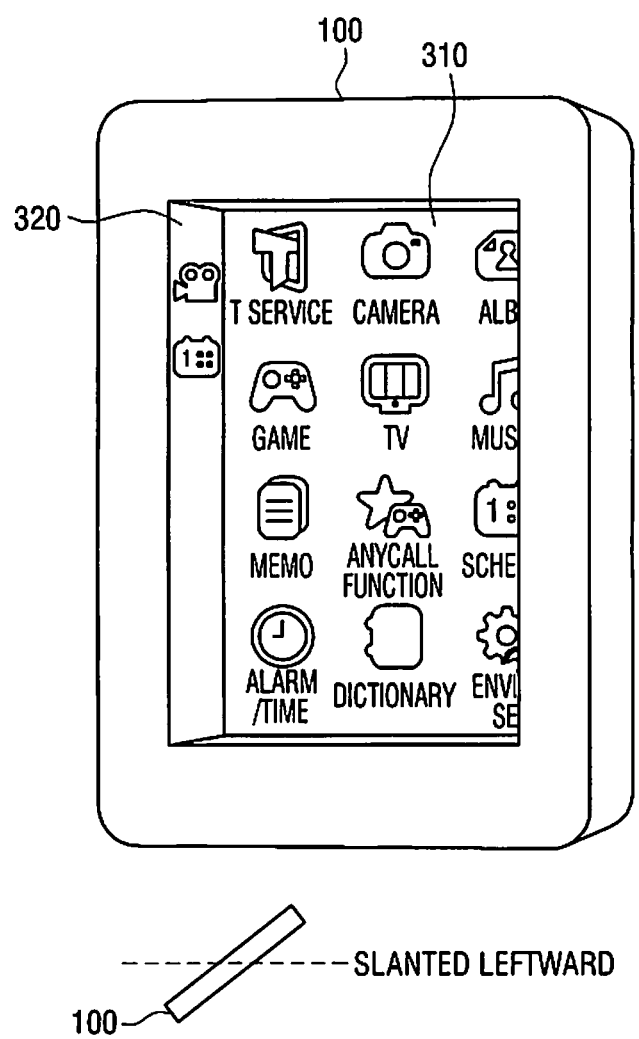

FIG. 3B illustrates the state when the mobile phone 100 is slanted slightly leftward. Referring to FIG. 3B, the leftward face 320 of the 3D GUI appears as the mobile phone 100 slightly slants leftward. FIG. 3C illustrates the screen of the mobile phone 100 slanting further in the leftward direction in which case the entirety of the leftward face 320 is displayed.

As explained above, the mobile phone 100 displays the face in the corresponding direction when the manipulation by slanting is inputted to a specific direction.

Figure 4:
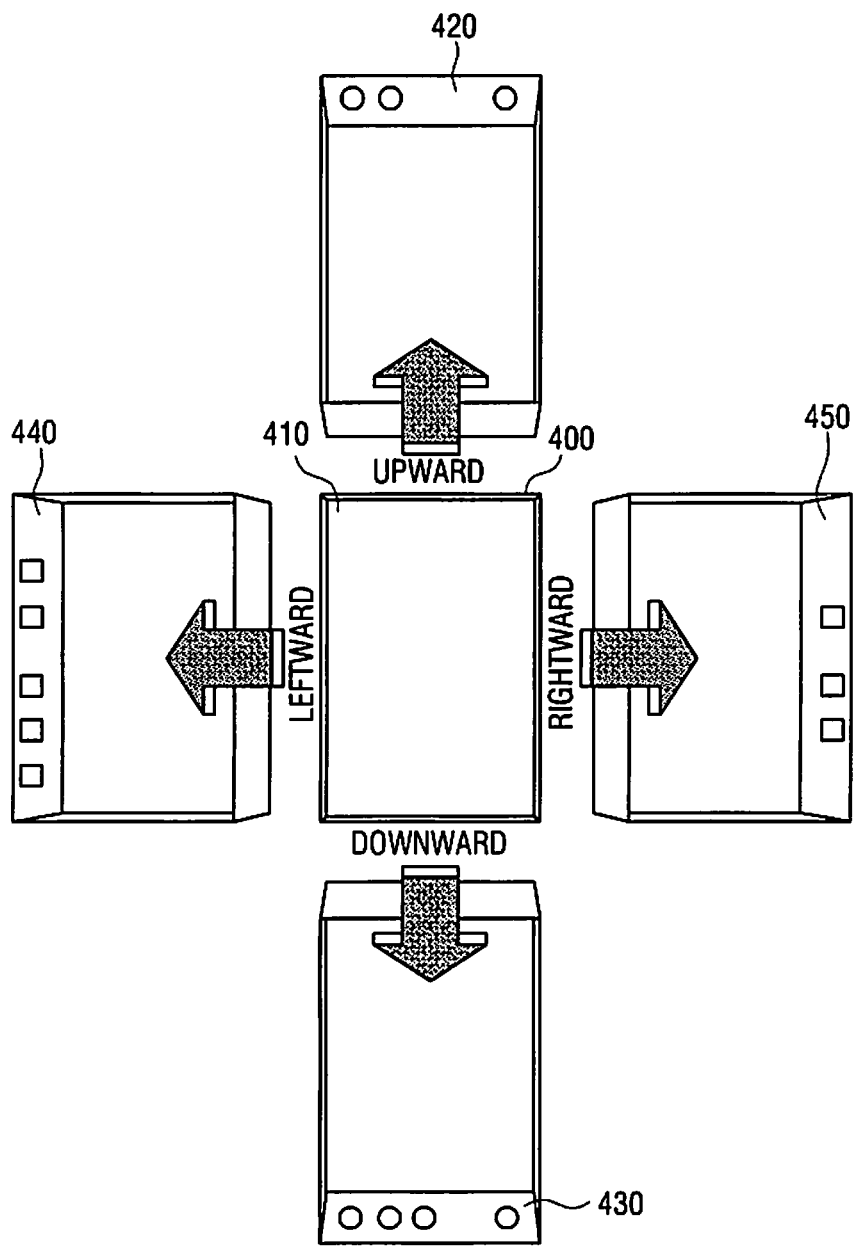
FIG. 4 illustrates the structure of a 3D GUI according to an embodiment of the present invention.

FIG. 4 illustrates the structure of the 3D GUI 400 according to an embodiment of the present invention. Referring to FIG. 4, the 3D GUI 400 is implemented as a rectangular parallelepiped having five faces.

If the 3D GUI 400 slants upward in a state that the specific face 410 of the 3D GUI 400 is displayed, the upward face 420 is displayed. If the 3D GUI 400 slants downward in a state that the specific face 410 of the 3D GUI 400 is displayed, the downward face 430 is displayed. If the 3D GUI 400 slants leftward in a state that the specific face 410 of the 3D GUI 400 is displayed, the leftward face 440 is displayed. If the 3D GUI 400 slants rightward in a state that the specific face 410 of the 3D GUI 400 is displayed, the rightward face 450 is displayed.

Accordingly, the mobile phone 100 generates a 3D GUI constructed based on the five faces of the rectangular parallelepiped, and displays the generated 3D GUI on a screen.

Figure 5:
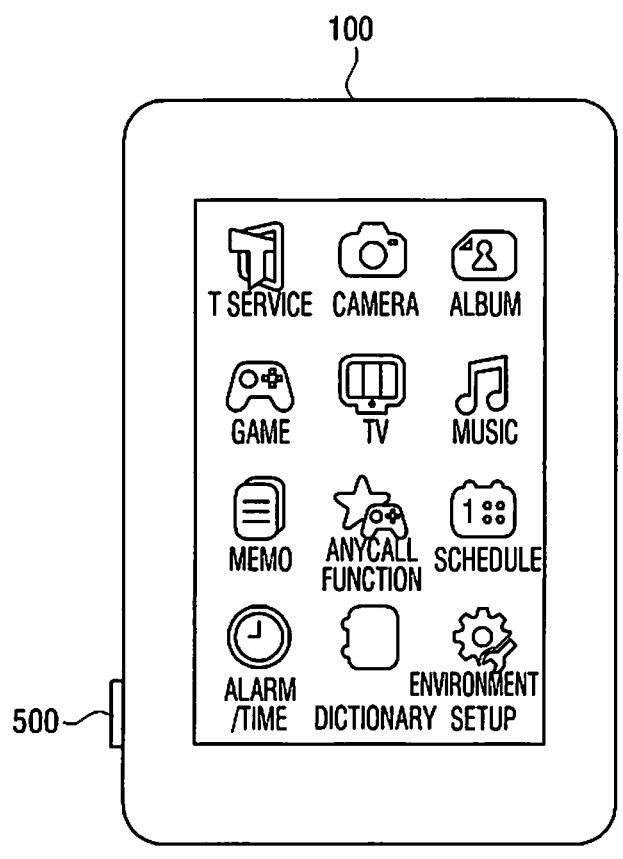
FIG. 5 illustrates a mobile phone having a motion start button according to an embodiment of the present invention.

FIG. 5 illustrates a mobile phone having a motion start button 500 thereon according to an embodiment of the present invention. Referring to FIG. 5, if the user presses the motion start button 500, the mobile phone 100 starts detecting for motion with respect to the current plane of the mobile phone 100 as the reference plane. Accordingly, the mobile phone 100 perceives the manipulation by slanting.

Although the mobile phone 100 is illustrated in FIG. 5 as it includes the motion start button 500, the mobile phone 100 may perceive the beginning of the motion based on other types of manipulation.

Figure 6A:
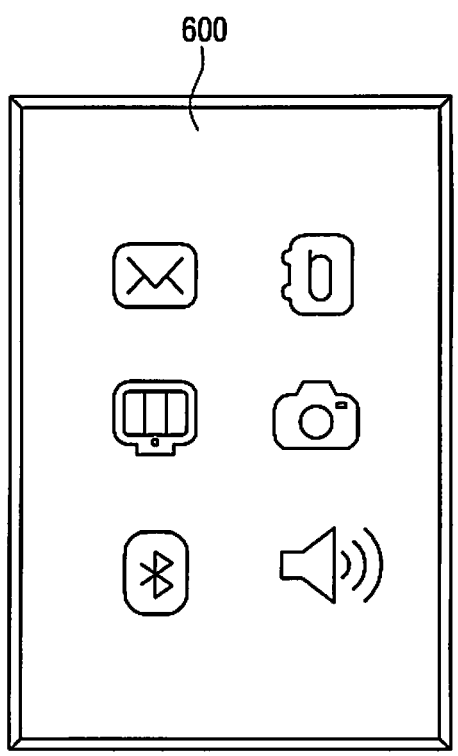
FIGS. 6A to 6C illustrate instances when the menu on the leftward face is displayed, and instances when the menus on the leftward and upward faces are displayed, according to an embodiment of the present invention.
Figure 6A:
Figure 6B:
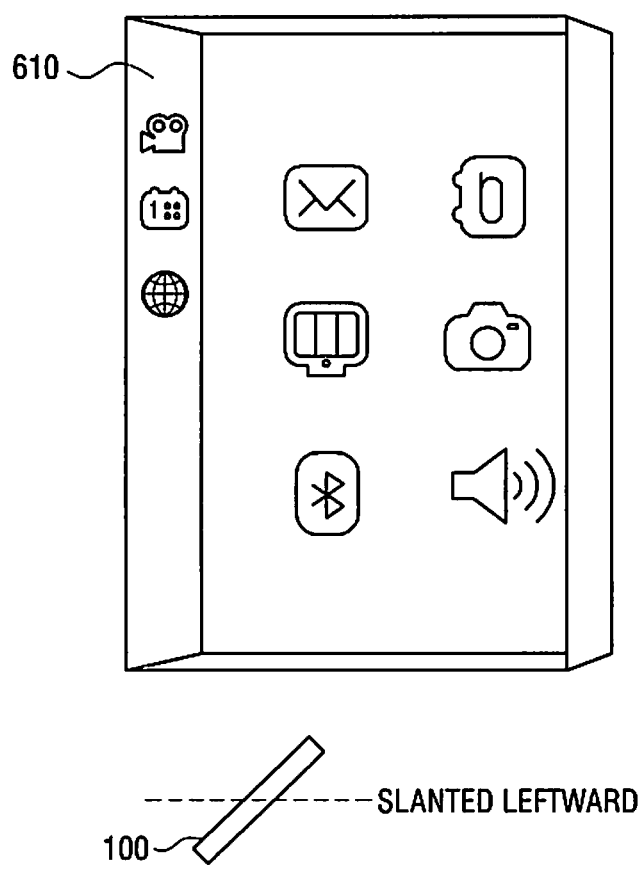
Figure 6C:
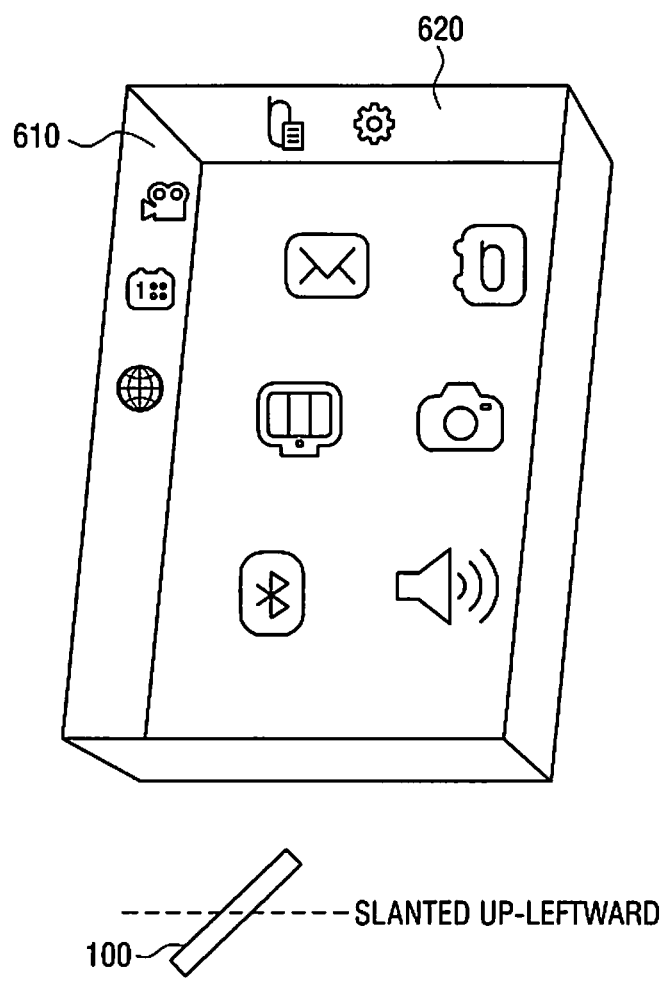

FIGS. 6A to 6C illustrate the displaying of the leftward menu and of displaying the leftward and upward menus concurrently, according to the present invention.

FIG. 6A illustrates an instance when the menu is displayed on the specific face and the mobile phone 100 is not slanted. In this state, if a manipulation by slanting in leftward direction is inputted to the mobile phone 100, the mobile phone 100 displays the menu on the leftward face 610 as illustrated in FIG. 6B.

If a manipulation by slanting in left-upward direction is inputted to the mobile phone 100, the mobile phone 100 displays the menu on the leftward face 610 and the menu on the upward face 620 concurrently as illustrated in FIG. 6C.

Accordingly, in response to a manipulation by slanting in the diagonal direction, the menus on two faces are displayed concurrently.

FIGS. 7A to 7D illustrate the process of selecting a lower menu using the 3D GUI menu according to an embodiment of the present invention. The menu has a hierarchy structure which includes a first level, a second level, a third level, and a fourth level.

Figure 7A:
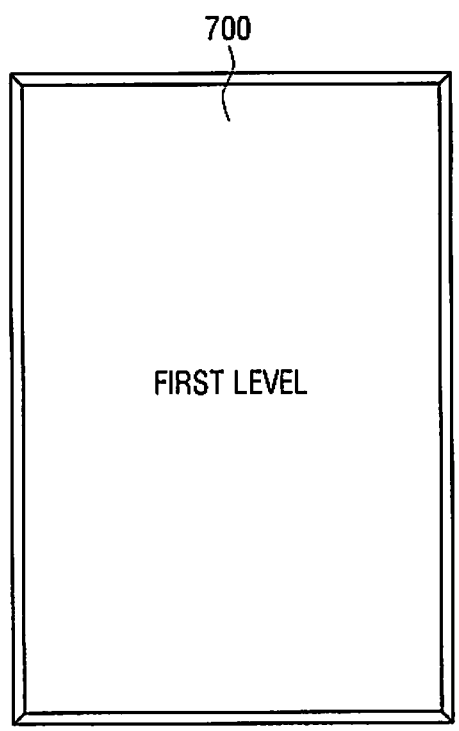
FIGS. 7A to 7D illustrate the process of selecting a subordinate menu using the 3D GUI menu according to an embodiment of the present invention.
Figure 7B:
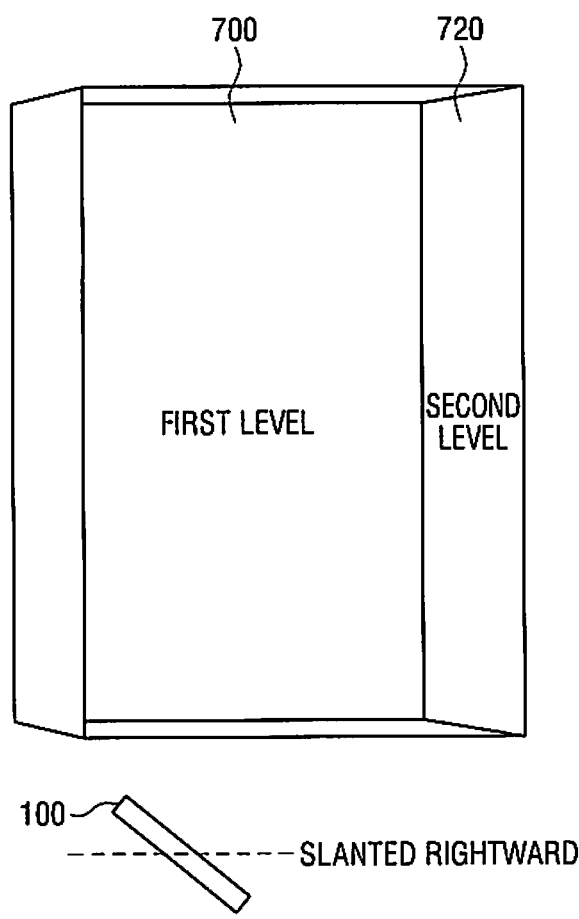

Referring to FIG. 7A, if a user slants the mobile phone 100 rightward direction from a state that the mobile phone 100 displays the menu on the specific face 700 of a first level, as illustrated in FIG. 7B, a menu in the second level is displayed on the rightward face 720 as the subordinate menu to the first level.

Figure 7C:
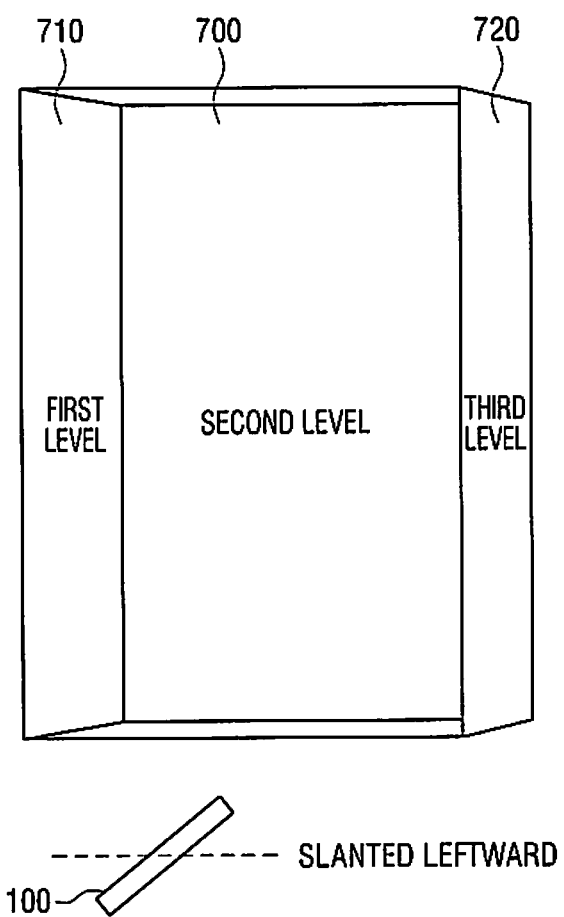

In the state illustrated in FIG. 7B, if the user selects one item from the menu in the first level, as illustrated in FIG. 7C, the menu in the second level which is subordinate menu to the selected item, is displayed on the specific face 700. The menu in the first level is displayed on the leftward face 710, and a menu in the third level is displayed on the rightward face 720. The 'third level' herein refers to the subordinate menu of the menu in the second level.

Figure 7D:
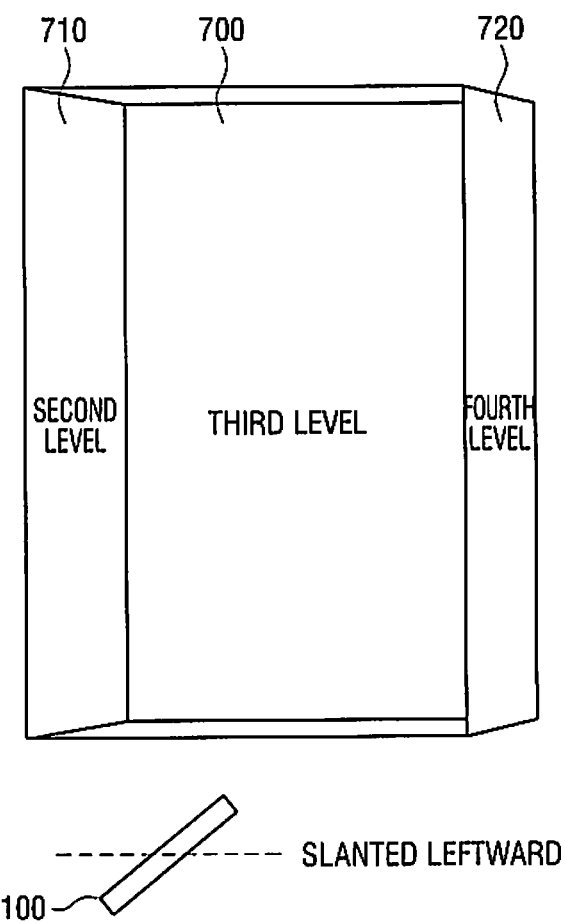

In the state illustrated in FIG. 7B, if the user selects one item from the menu in the first level displayed on the rightward face 720, as illustrated in FIG. 7D, the menu in the third level which is subordinate menu to the selected item, is displayed on the specific face 700. The menu in the second level is displayed on the leftward face 710, and a menu in the fourth level is displayed on the rightward face 720. The 'fourth level' herein refers to the subordinate menu of the menu in the third level.

As explained above, using the 3D GUI in the rectangular parallelepiped shape, the user is able to select the upper or lower menus with respect to the menu currently displayed on the specific face.

FIGS. 8A to 8D illustrate the process in which the user selects an item displayed on the specific face, according to an embodiment of the present invention.

Figure 8A:
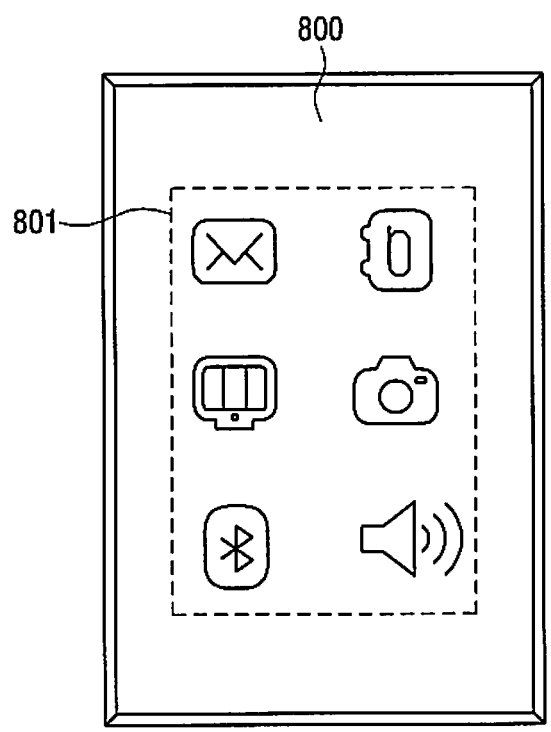
FIGS. 8A to 8D illustrate the process in which the user selects an item displayed on the specific face according to an embodiment of the present invention.

FIG. 8A illustrates a state in which icons 801 of the main menu are displayed on the 3D GUI of the screen of the mobile phone. In this state, if a manipulation by slanting in leftward direction is inputted to the mobile phone 100, as illustrated in FIG. 8B, the leftward face 810 of the 3D GUI is displayed.

Figure 8B:
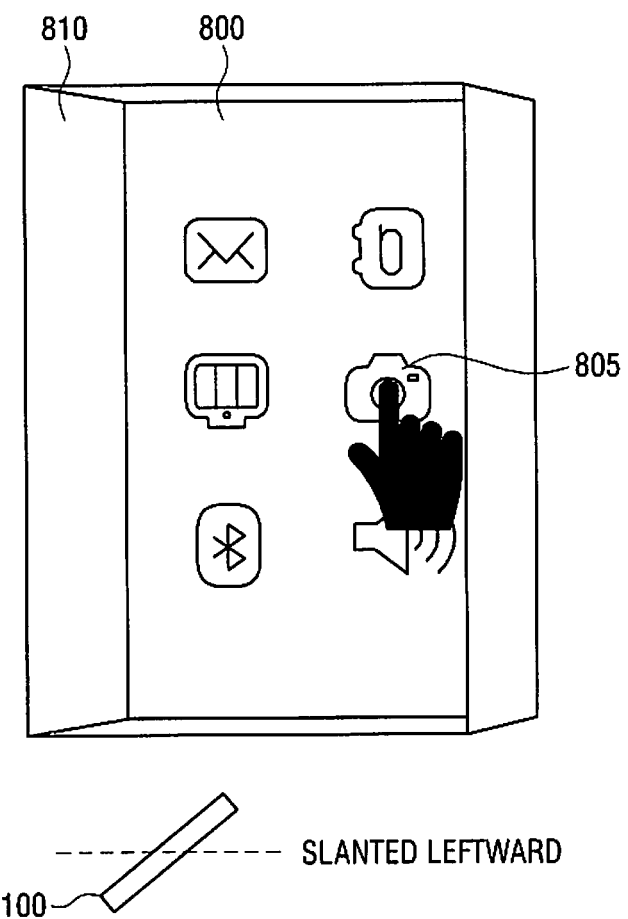
Figure 8C:
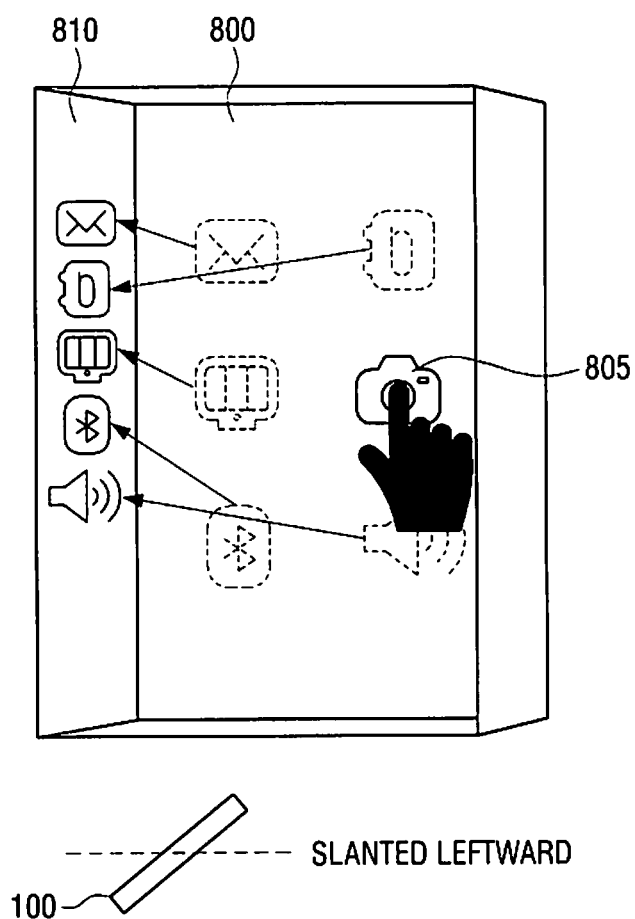
Figure 8D:
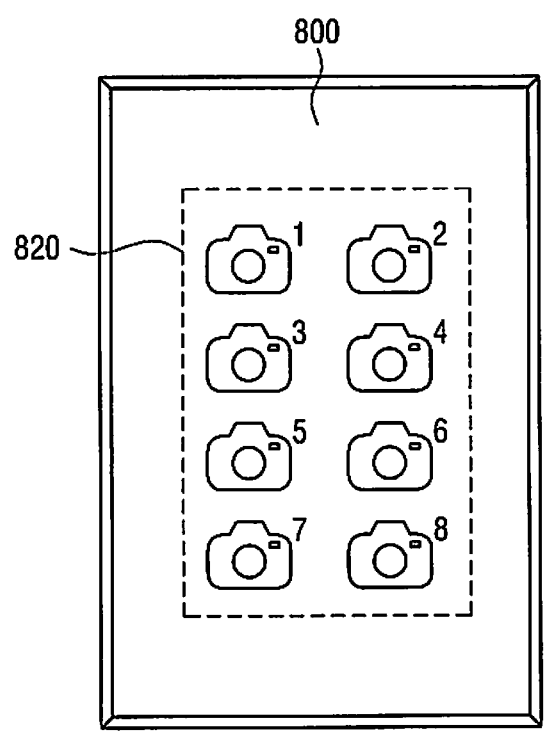
Figure 8D:

Referring to FIG. 8B, in response to the selection of a camera icon 805 by the user, all the icons except the camera icon 805 move to the leftward face 810 as illustrated in FIG. 8C. Referring to FIG. 8D, the mobile phone 100 displays the icons 820 representing the subordinate menus of the camera icon, on the specific face.

Through the process explained above, the mobile phone 100 displays the subordinate menus of the user selected icon on the specific face 800, and displays the other non-selected icons on the leftward face 810.

FIGS. 9A to 9D illustrate the process of selecting an item on the menu displayed on the leftward face 910, according to an embodiment of the present invention.

Figure 9A:
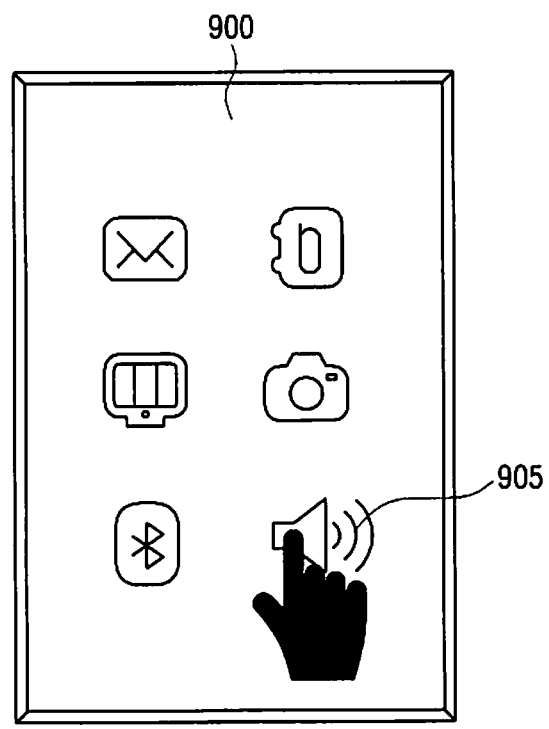
FIGS. 9A to 9D illustrate the process of selecting an item of a menu displayed on the leftward face according to an embodiment of the present invention.
Figure 9B:
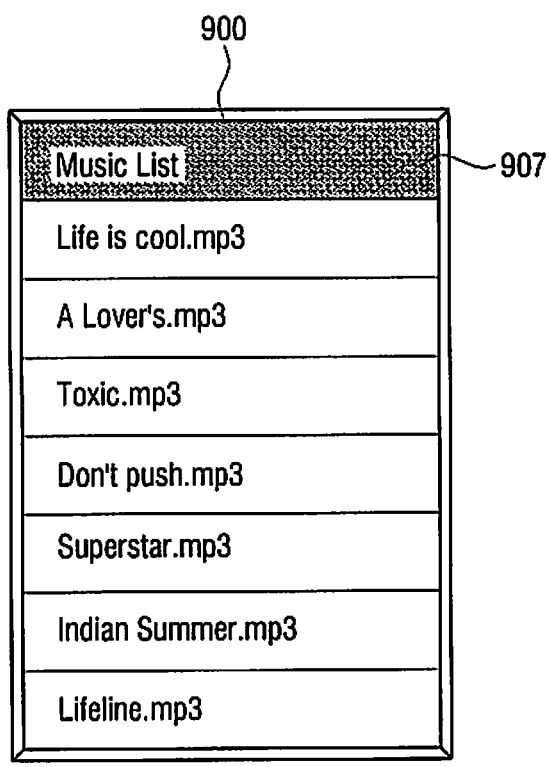
Figure 9B:
Figure 9C:
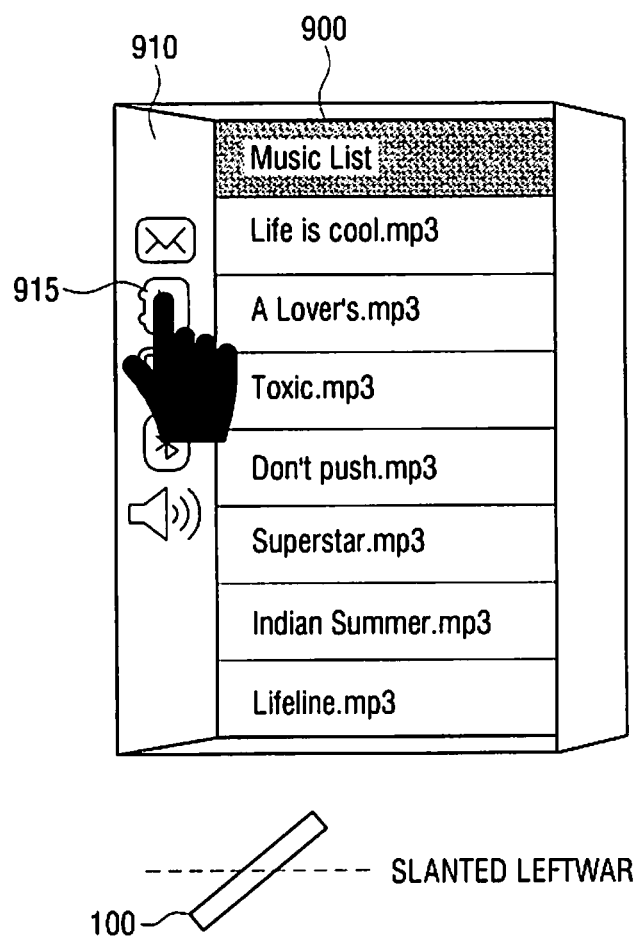

FIG. 9A illustrates the state where the main menu on the specific face 900 of the 3D GUI is displayed on the screen of the mobile phone 100, which is not slanted. Referring to FIG. 9A, as the user selects the music icon 905, the mobile phone 100 displays the music list 907 on the specific face 900 as illustrated in FIG. 9B. If a manipulation by slanting is inputted in the leftward direction to the mobile phone 100, as illustrated in FIG. 9C, the mobile phone 100 displays the leftward face 910 of the 3D GUI. At this time, there are icons of the main menu, i.e., upper menus, displayed on the leftward face 910.

Figure 9D:
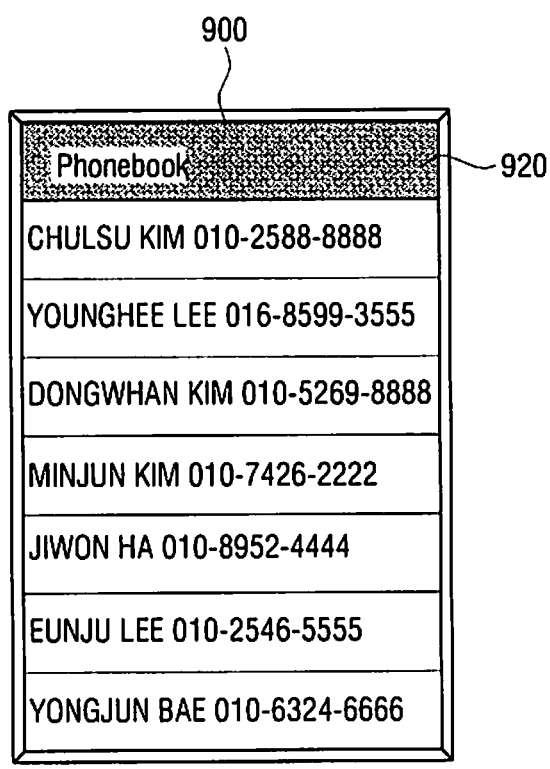
Figure 9D:
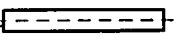

In this state, if the user selects a phonebook icon 915 on the leftward face 910 as illustrated in FIG. 9C, the mobile phone 100 displays the phonebook 920 on the specific face 900 as illustrated in FIG. 9D.

As explained above, the mobile phone 100 may display on the leftward face 910 the upper menu of the menu currently displayed on the specific face 900. Accordingly, the user is able to see the upper menu easily by simply slanting the mobile phone 100 in the leftward direction.

FIGS. 10A to 10D illustrate the process of bookmarking on a menu displayed on the rightward face 1020 according to an embodiment of the present invention.

Figure 10A:
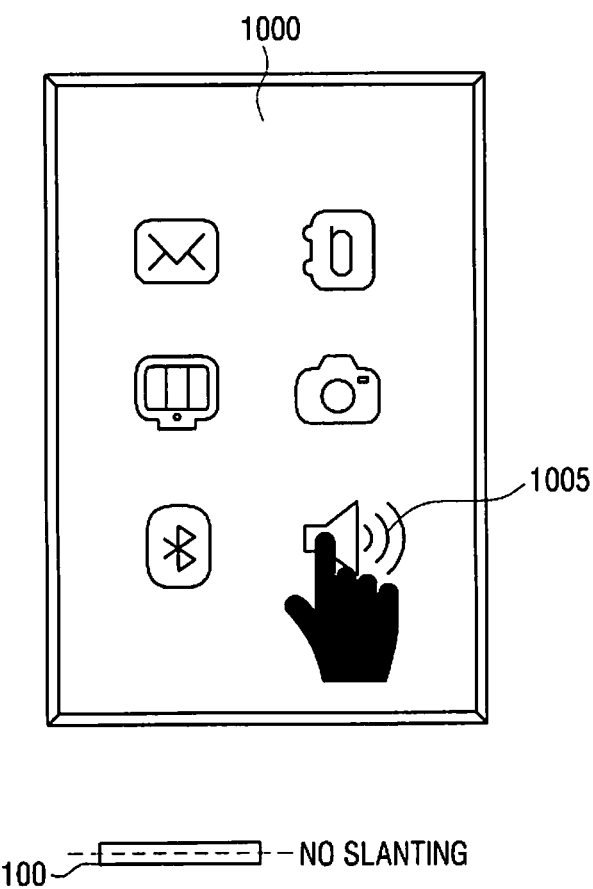
FIGS. 10A to 10D illustrate the process of bookmarking on a menu displayed on the rightward face, according to an embodiment of the present invention.
Figure 10B:
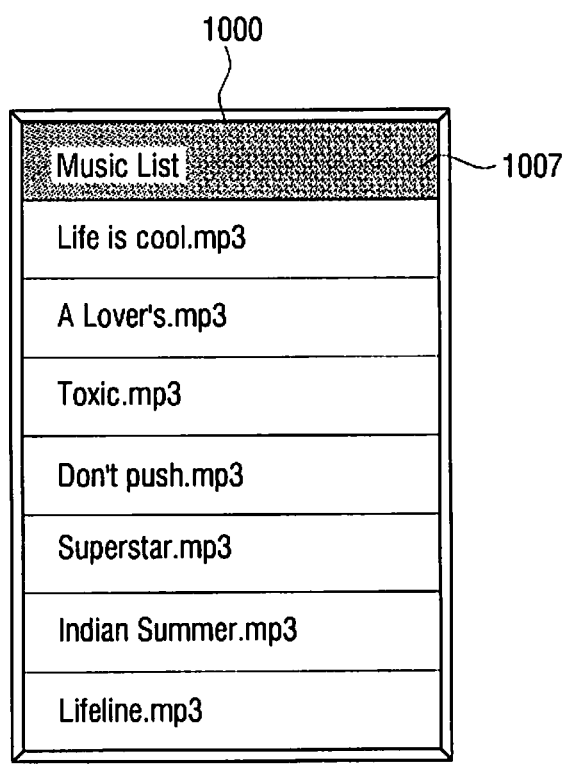
Figure 10B:
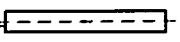
Figure 10C:
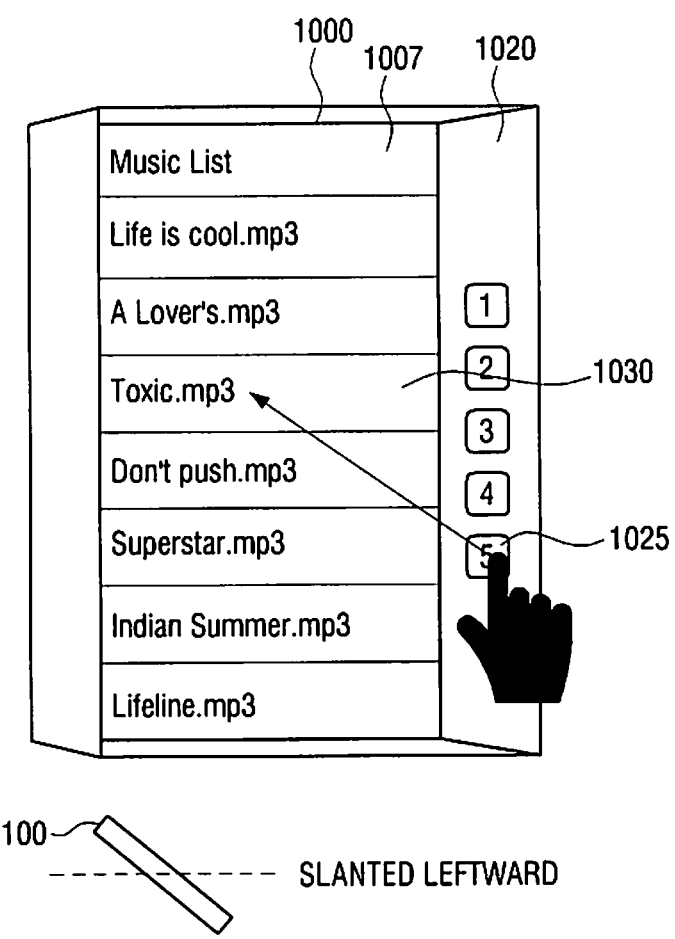

FIG. 10A illustrates a state in which the main menu on the specific face 1000 of the 3D GUI is displayed on the screen of the mobile phone 100. Referring to FIG. 10A, if a user selects a music icon 1005, the mobile phone 100 displays a music list 1007 on the specific face 1000, as illustrated in FIG. 10B. If a manipulation by slanting in the rightward direction is inputted to the mobile phone 100, the mobile phone 100 displays the rightward face 1020 of the 3D GUI as illustrated in FIG. 10C. Bookmark icons are displayed on the rightward face 1020.

Figure 10D:
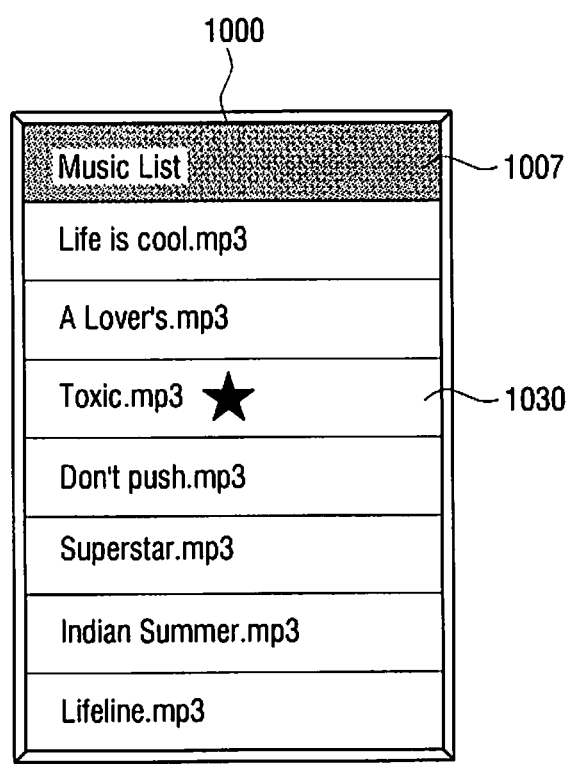
Figure 10D:
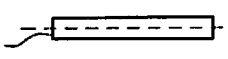

In the state explained above, if the user drags the fifth bookmark icon 1025 on the rightward face 1020 to a specific item 1030, the mobile phone 100 indicates that the specific item 1030 is bookmarked as illustrated in FIG. 10D.

As explained above, the mobile phone 100 may display bookmark icons on the rightward face 1020. Accordingly, by slanting the mobile phone 100 in the rightward direction, the user may check the bookmarks easily.

FIGS. 11A to 11D illustrate the process of displaying the widget on the specific face using the menu displayed on the leftward face 1100, according to an embodiment of the present invention.

Figure 11A:
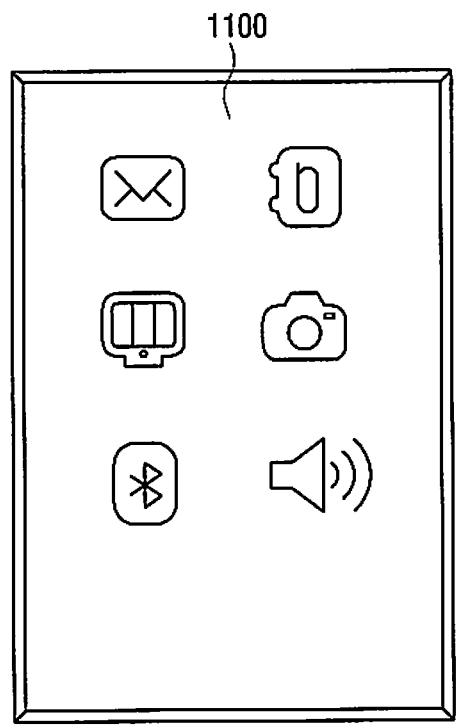
FIGS. 11a to 11D illustrate the process of displaying the widget on the specific face using the menu displayed on the leftward face, according to an embodiment of the present invention.
Figure 11B:
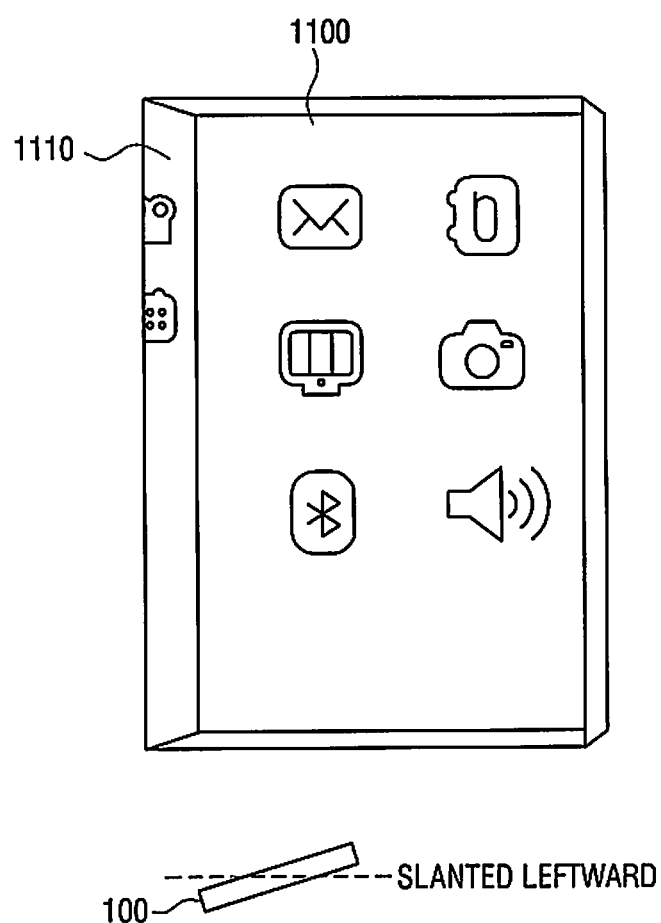

FIG. 11A illustrates the state in which the main menu on the specific face 1100 of the 3D GUI is displayed on the screen of the mobile phone 100. If the mobile phone 100 is slanted leftward, the mobile phone 100 starts displaying the leftward face 1110 of the 3D GUI as shown in FIG. 11B.

Figure 11C:
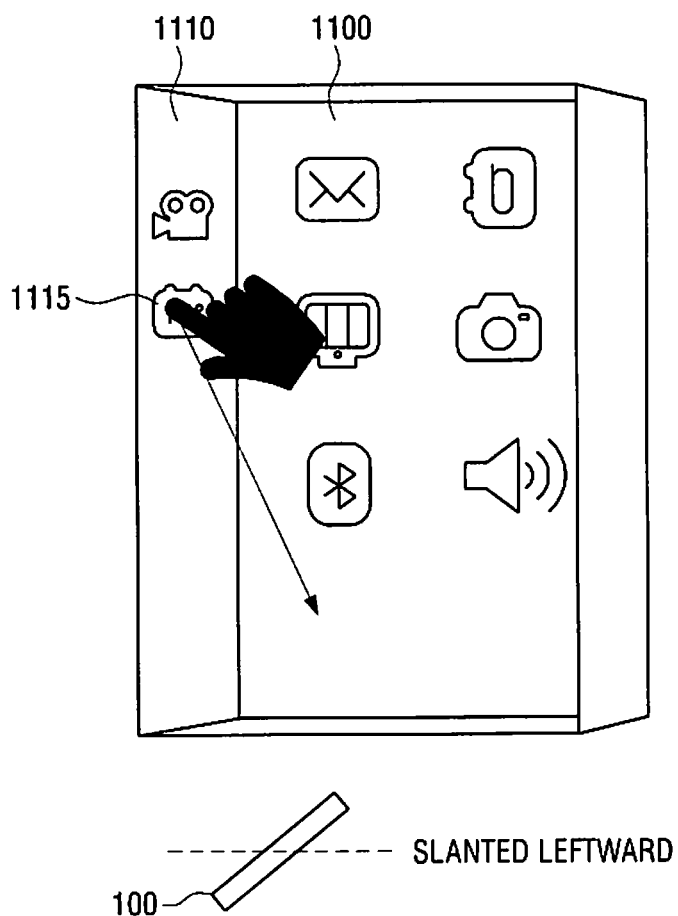
Figure 11D:
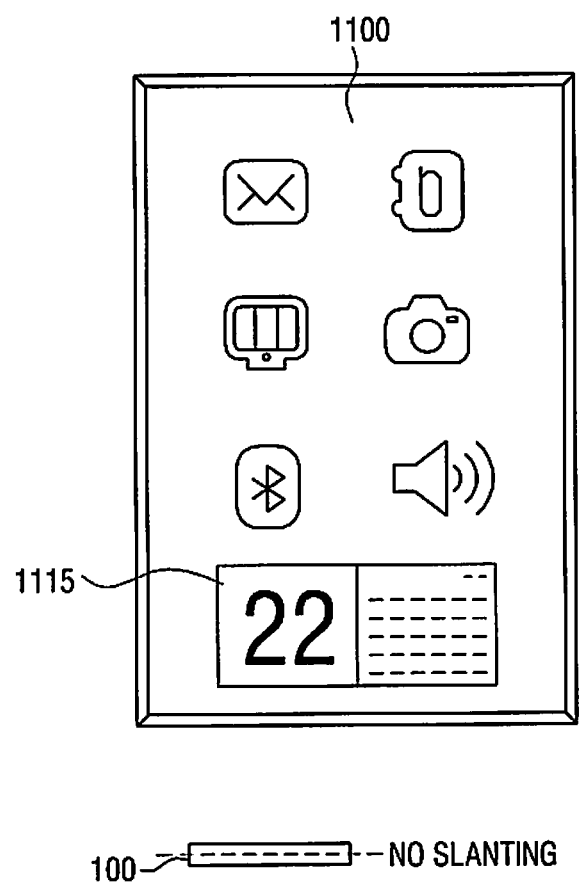

If the mobile phone 100 is slanted further in the leftward direction, as illustrated in FIG. 11C, the entire leftward face 1110 is displayed. The widget icons are displayed on the leftward face 1110. Referring to FIG. 11C, if the user drags-and-drops the calendar widget 1115 to the area of the specific face 1100, as illustrated in FIG. 11D, the mobile phone 100 displays the calendar widget 1115 on the specific face 1100.

FIGS. 12A to 12D illustrate the process of moving the widget from the specific face to the item of the menu displayed on the leftward face 1210.

Figure 12A:
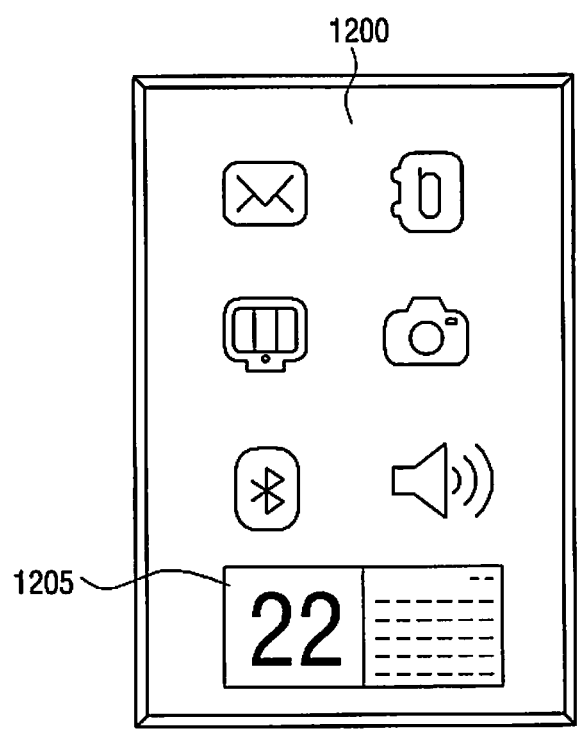
FIGS. 12A to 12D illustrate the process of moving the widget from the specific face to the item of the menu displayed on the leftward face, according to an embodiment of the present invention.
Figure 12B:
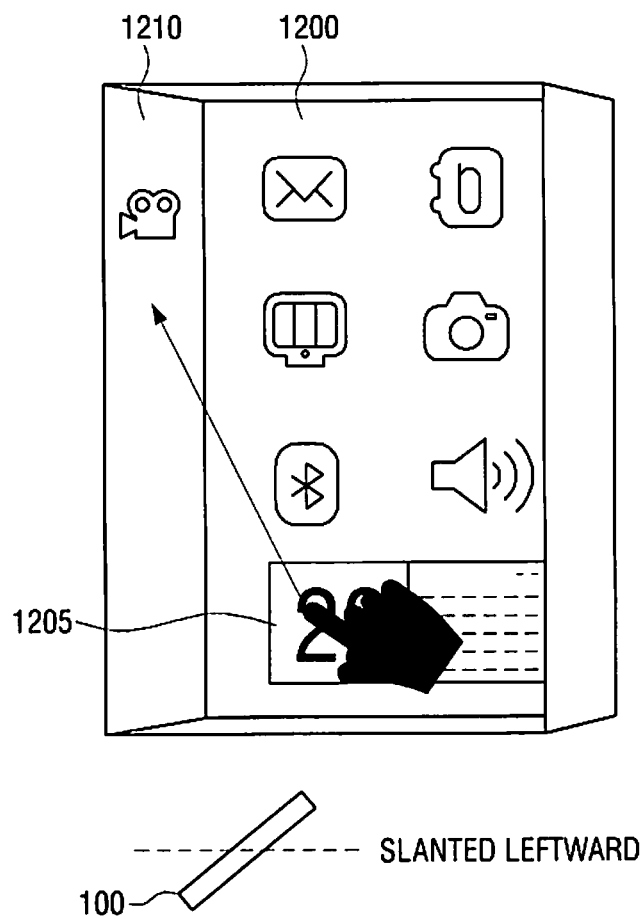
Figure 12C:
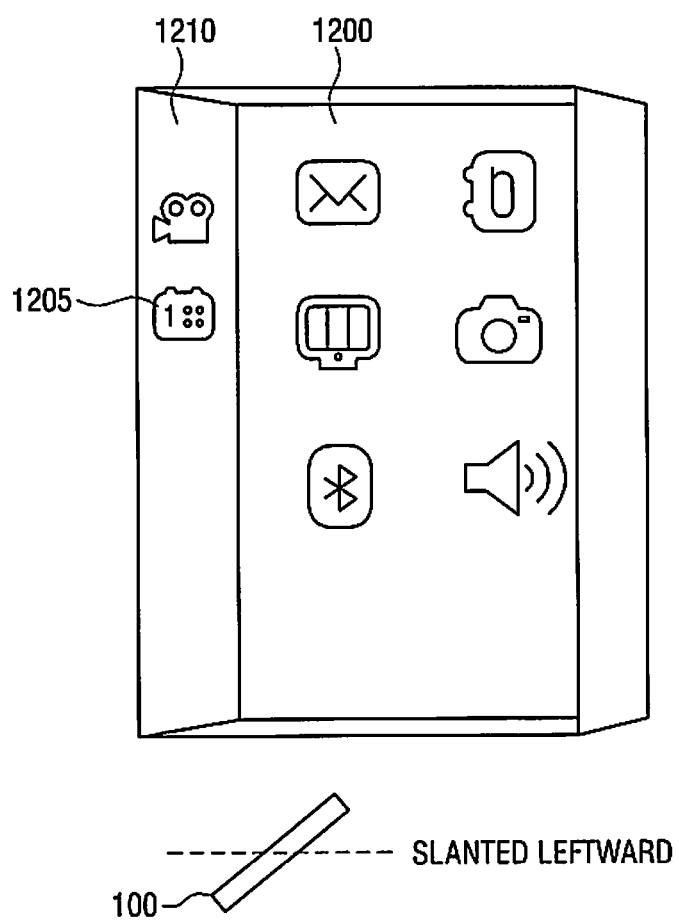
Figure 12D:
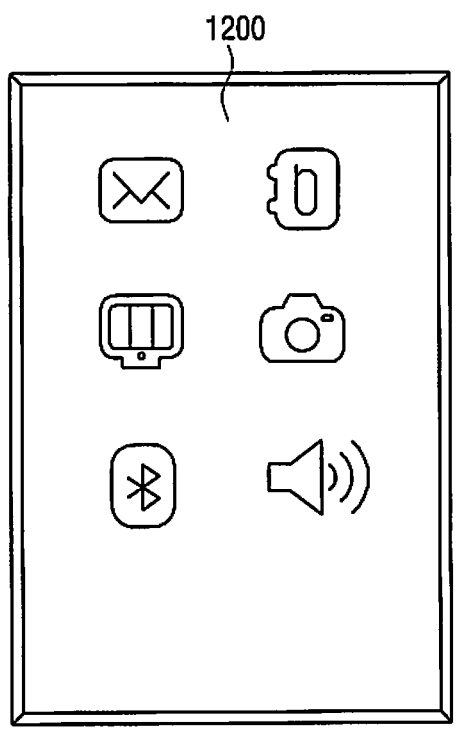
Figure 12D:

FIG. 12A illustrates the state in which the main menu on the specific face 1200 of the 3D GUI is displayed on the screen of the mobile phone 100. Referring to FIG. 12A, the calendar widget 1205 is displayed together on the specific face 1200. Referring to FIG. 12B, if the user drags-and-drops the calendar widget 1205 to the leftward face 1210, the calendar widget icon disappears from the specific face 1200 and is displayed on the leftward face 1210 as illustrated in FIG. 12C. Accordingly, referring to FIG. 12D, the calendar widget is not displayed on the specific face 1200.

As explained above, the mobile phone 100 may provide the widget using the leftward face 1210 of the 3D GUI.

FIGS. 13A to 13D illustrate the process of displaying icons on the specific face with respect to a direction viewed by the user, according to an embodiment of the present invention.

Figure 13A:
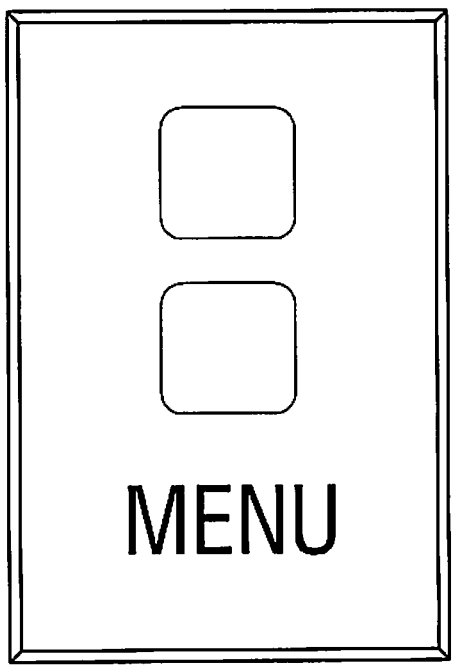
FIGS. 13A to 13D illustrate the process of displaying icons on the specific face in accordance with a direction viewed by the user, according to an embodiment of the present invention.
Figure 13A:
Figure 13B:
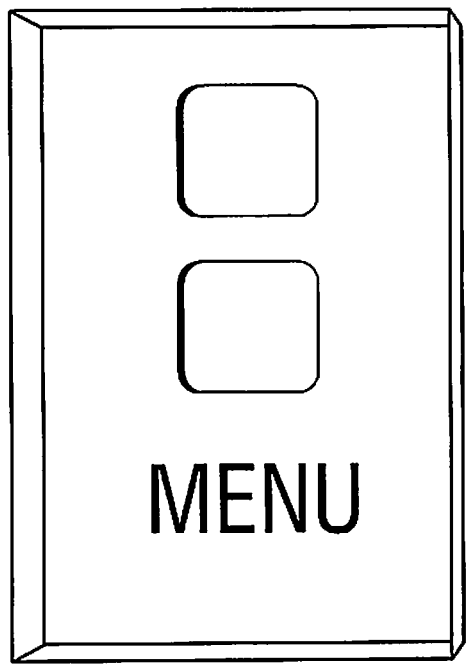
Figure 13B:
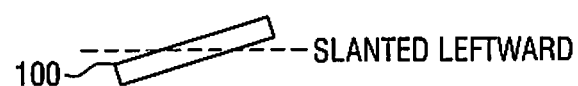
Figure 13C:
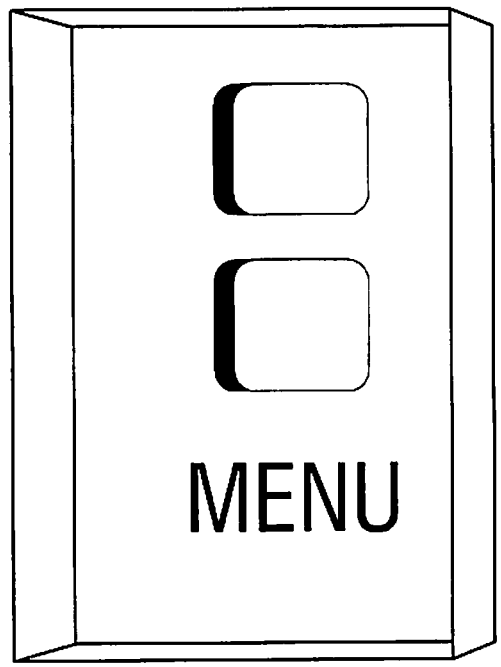
Figure 13C:
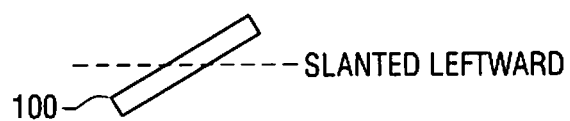
Figure 13D:
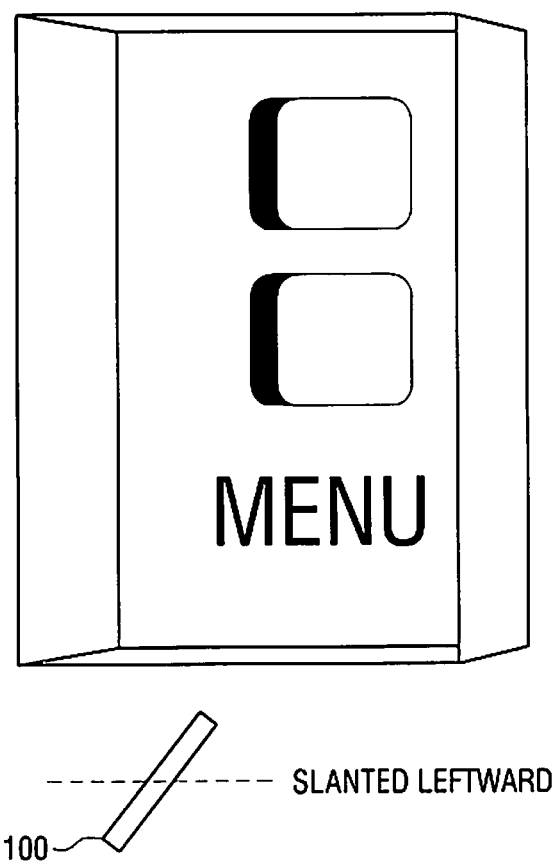

FIG. 13A illustrates the menu screen which is not slanted. FIGS. 13B, 13C and 13D illustrate the screen displayed when the mobile phone 100 is slanted at a gradually increasing angle in the leftward direction. When slanted in the leftward direction, the mobile phone 100 displays the menu screen slanted in the rightward direction in the 3D GUI to correspond to the leftward slanting thereof. Since the menu is slanted in the rightward direction, the user viewing the menu screen feels as if the menu is being viewed from the front.

As explained above, the mobile phone 100 displays the 3D GUI on the specific face and the adjoining faces to the specific face of the rectangular parallelepiped, and controls the 3D GUI based on the manipulation by slanting. Accordingly, the user is able to see new menus by simply slanting the mobile phone 100, and thus use an otherwise complicated menu with increased ease.

Figure 14:
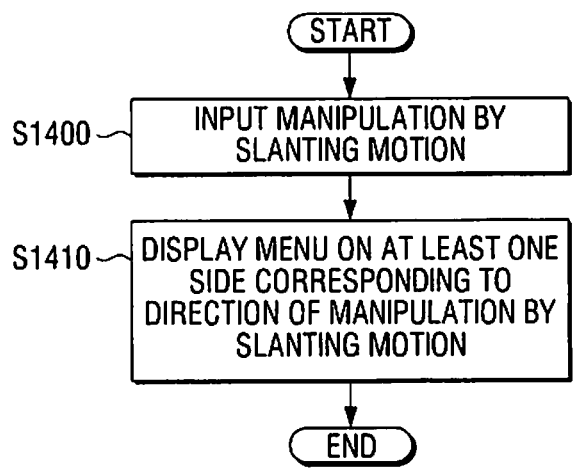
FIG. 14 is a flowchart illustrating the process of displaying a menu on a corresponding side of a two dimensional (2D) GUI environment, if a manipulation by slanting motion is inputted to the mobile phone, according to an embodiment of the present invention.

Hereinbelow, a 2D GUI will be explained with reference to FIGS. 14 to 15C. FIG. 14 is a flowchart of the process of displaying a menu on a corresponding side of a 2D GUI, in response to an input of a manipulation by slanting of the mobile phone, according to an embodiment of the present invention.

At S1400, a manipulation by slanting motion is inputted to the mobile phone 100. At S1410, the mobile phone 100 displays the menu on at least one of upward, downward, leftward and rightward sides of the screen of the mobile phone 100 that corresponds to the direction of the manipulation by slanting.

Figure 15A:
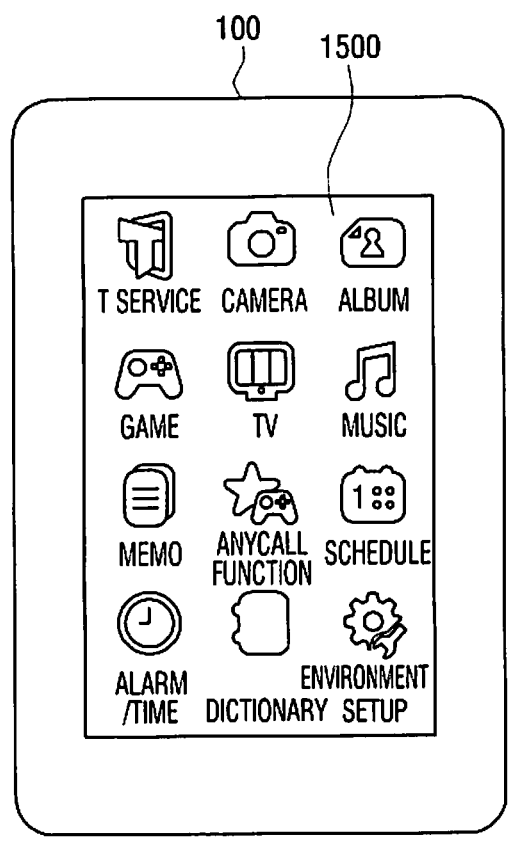
FIGS. 15A to 15C illustrate the process of displaying a menu on a corresponding side of a 2D GUI environment, if a manipulation by slanting motion is inputted to the mobile phone, according to an embodiment of the present invention.
Figure 15B:
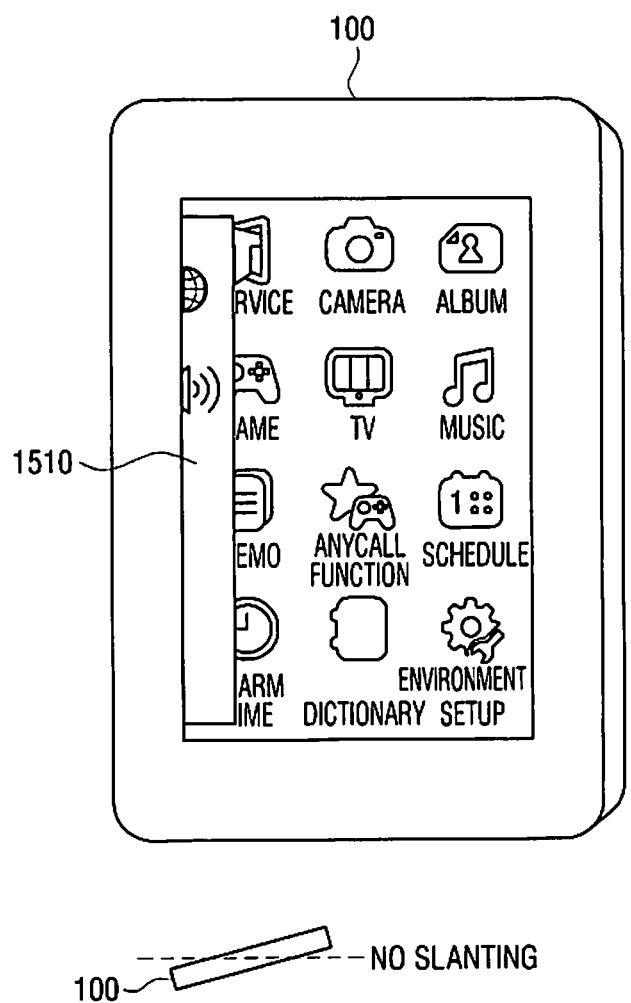
Figure 15C:
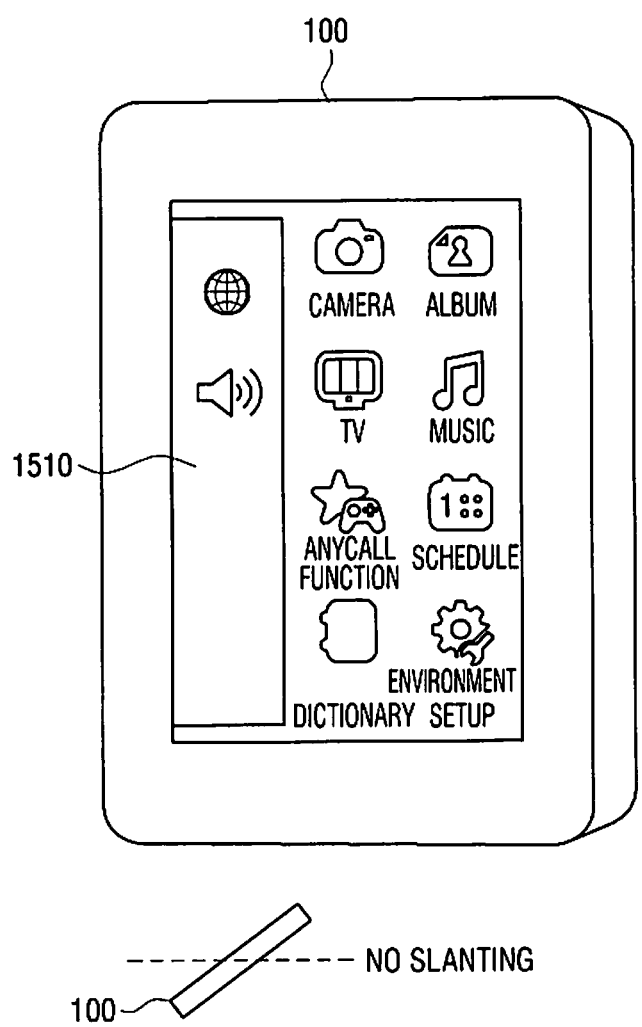

FIGS. 15A to 15C illustrate the process of displaying a menu on a corresponding side of a 2D GUI of the mobile phone, in response to an input of a manipulation by slanting motion, according to an embodiment of the present invention.

FIG. 15A illustrates the screen of the mobile phone 100 on which the main menu 1500 is displayed. Referring to FIG. 15B, if the mobile phone 100 is slanted gradually in the leftward direction, the mobile phone 100 starts displaying the submenu 1510 on the left side. If the mobile phone 100 is slanted further in the leftward direction, the mobile phone 100 displays the entire submenu 1510 on the left side, as shown in FIG. 15C.

As explained above, the mobile phone 100 may provide a 2D GUI environment and display the menu on the side corresponding to the direction of slanting, if a manipulation by slanting motion is inputted to the mobile phone 100.

Although in the foregoing description the 3D GUI is implemented based on five faces of the rectangular parallelepiped, this description is given for illustrative purposes only, and the 3D GUI may be constructed with two to four faces of the rectangular parallelepiped.

Furthermore, any GUI is implementable according to an embodiment of the present invention, provided that the GUI is capable of displaying a menu based on the user manipulation by slanting the mobile phone. In other words, the 3D GUI according to an embodiment of the present invention is applicable to not only the rectangular parallelepiped, but also the other types of polygons.

Furthermore, the faces of the 3D GUI may display different contents or applications, or the like.

Hereinafter, a 3D GUI on which an application execution screen is displayed will be explained with reference to FIGS. 16A to 17C, which illustrate the mobile phone 100 held by a user in landscape orientation.

Figure 16A:
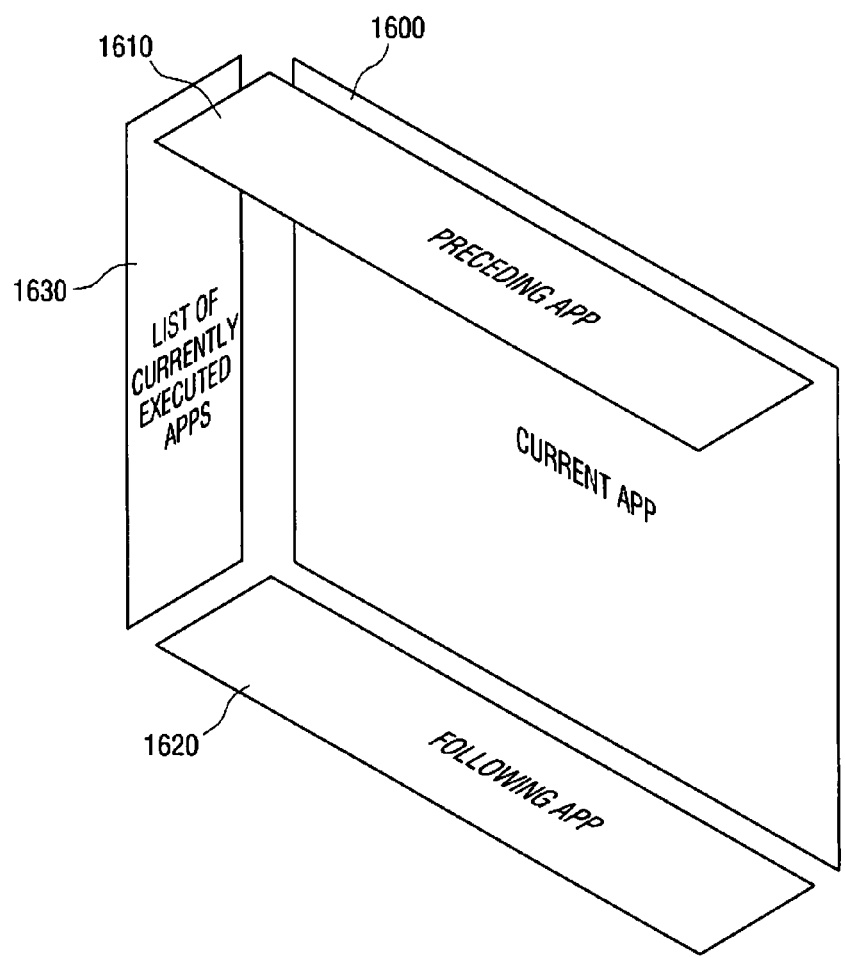
FIGS. 16A and 16B illustrate the structure of a 3D GUI which displays an application execution screen and an application list according to an embodiment of the present invention.
Figure 16B:
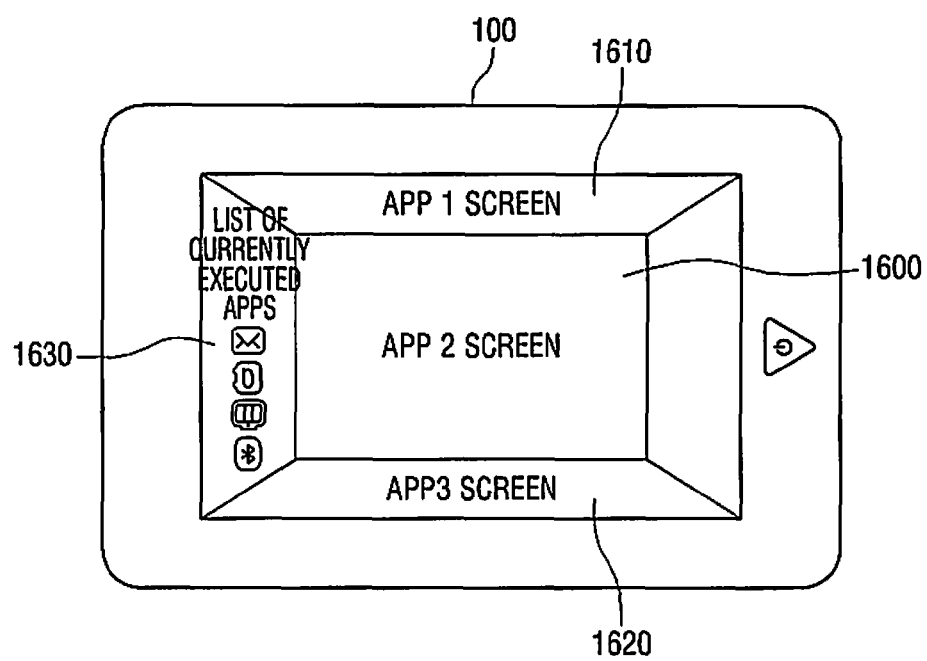

FIGS. 16A and 16B illustrate the structure of 3D GUI displaying an application execution screen and an application list, according to an embodiment of the present invention.

Referring to FIG. 16A, the mobile phone 100 displays the currently-executed application on the specific face 1600 of the 3D GUI. Additionally, based on the order of application arrangement, the mobile phone 100 displays the preceding application on the upward face 1610, and displays the following application on the downward face 1620. The mobile phone 100 displays the list of the currently-executed applications on the leftward face 1630.

FIG. 16B illustrates a screen of the mobile phone 100 on which the 3D GUI with the above-explained structure is displayed.

Figure 17A:
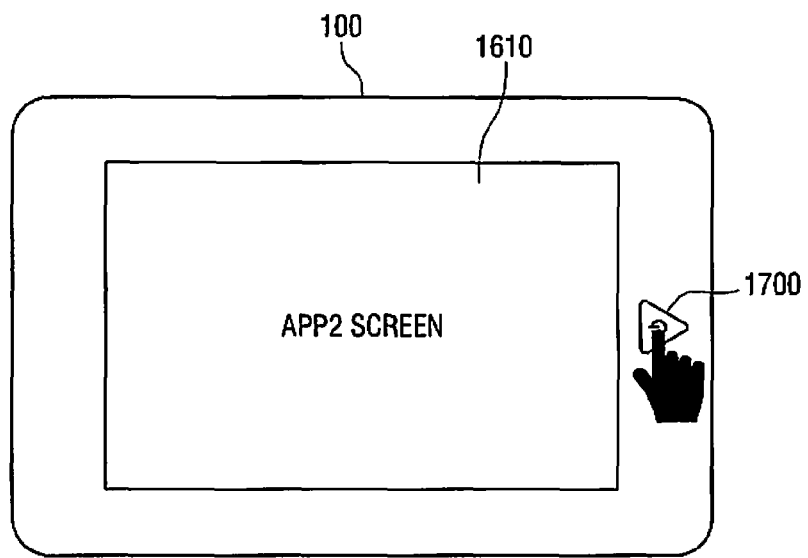
FIGS. 17A to 17C illustrate the process of using the 3D GUI on which application is displayed.
Figure 17B:
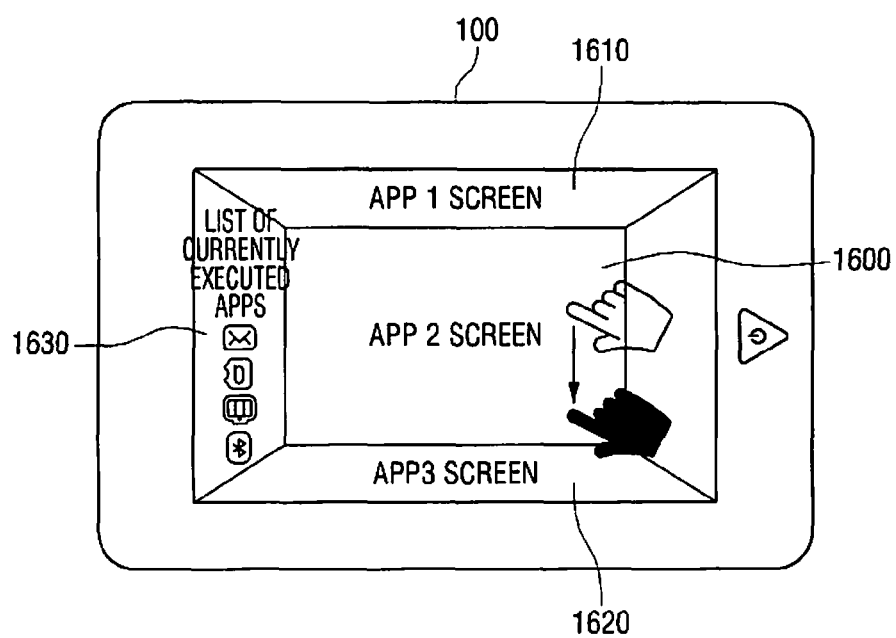
Figure 17C:
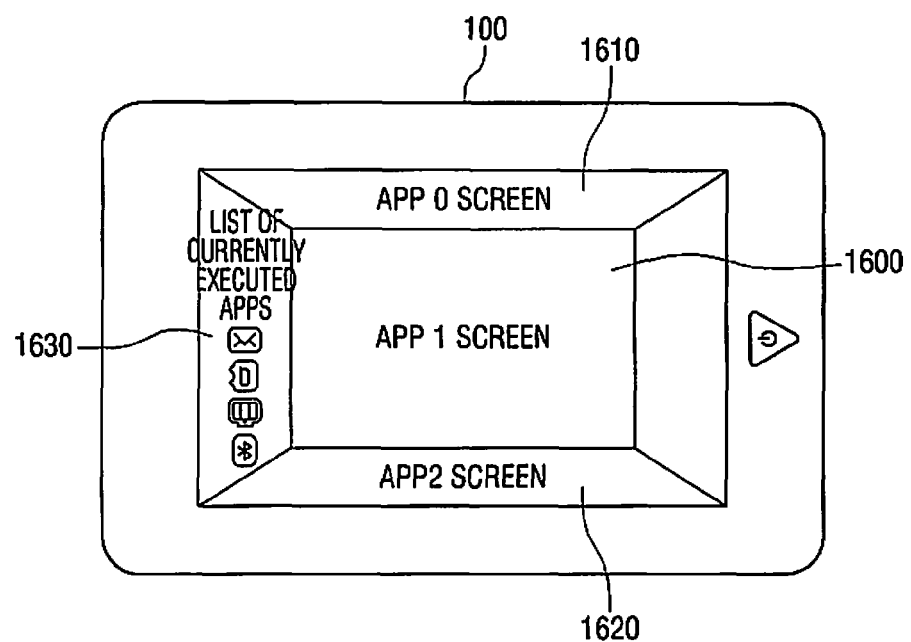

FIGS. 17A to 17C illustrate the process of using the 3D GUI in FIG. 16B, on which application is displayed.

FIG. 17A illustrates an example in which a screen of executing the application 'APP 2' is displayed on the specific face 1600 on the screen of the mobile phone 100. In FIG. 17A, the specific face 1600 is displayed as a full screen.

If a user manipulates a specific button 1700 arranged on the mobile phone 100, the mobile phone 100 displays the 3D GUI on the screen as illustrated in FIG. 17B.

FIG. 17B illustrates an example in which the 3D GUI is displayed on the screen of the mobile phone 100. The 3D GUI indicates 'APP 1' on the upward face 1610 as the application preceding 'APP 2' and 'APP 3' on the downward face 1620 as the application following 'APP 2'. The 3D GUI additionally displays a list of applications on the leftward face 1630.

In the state explained above, if a manipulation by touch (i.e., stroke) is inputted in a downward direction as illustrated in FIG. 17B, the mobile phone 100 displays the preceding application (i.e., application on the upward face 1610) as illustrated in FIG. 17C. Accordingly, referring to FIG. 17C, the 3D GUI indicates 'APP 0' on the upward face 1610 as the preceding application to 'APP 1', and 'APP 2" on the downward face 1620 as the following application to 'APP 1'.

As explained above, the user is able to select or change the currently-executed application using the 3D GUI.

Furthermore, the mobile phone 100 may adjust the direction of displaying the 3D GUI according to the direction viewed by the user.

Figure 18A:
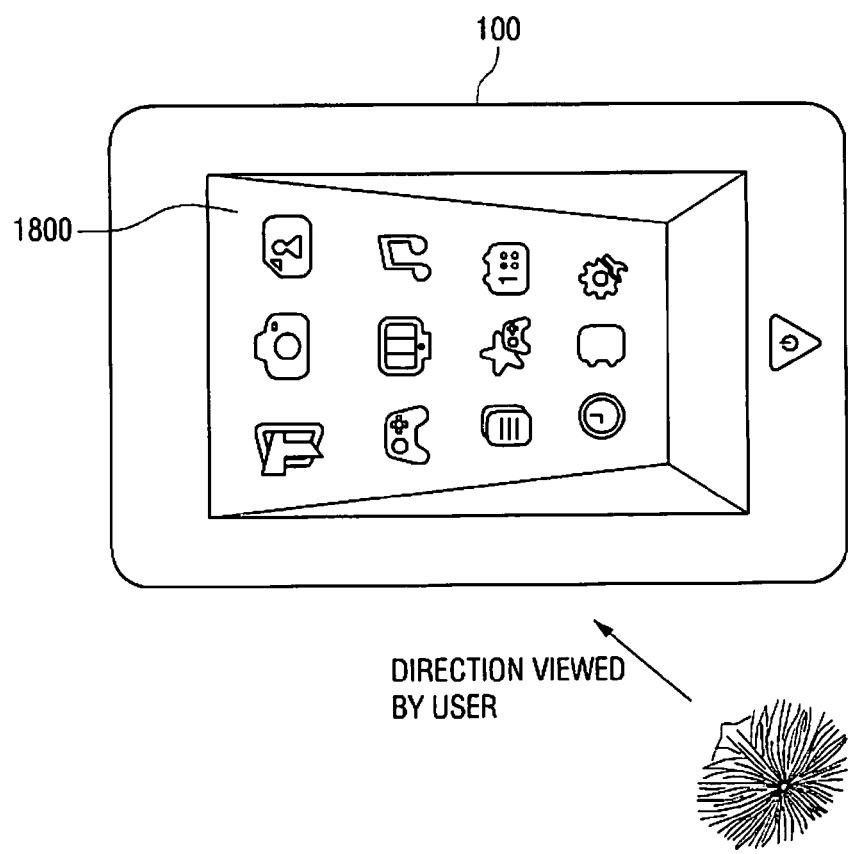
FIGS. 18A and 18B illustrate the process in which the mobile phone adjusts the direction in which the 3D GUI is displayed, according to the direction viewed by the user.
Figure 18B:
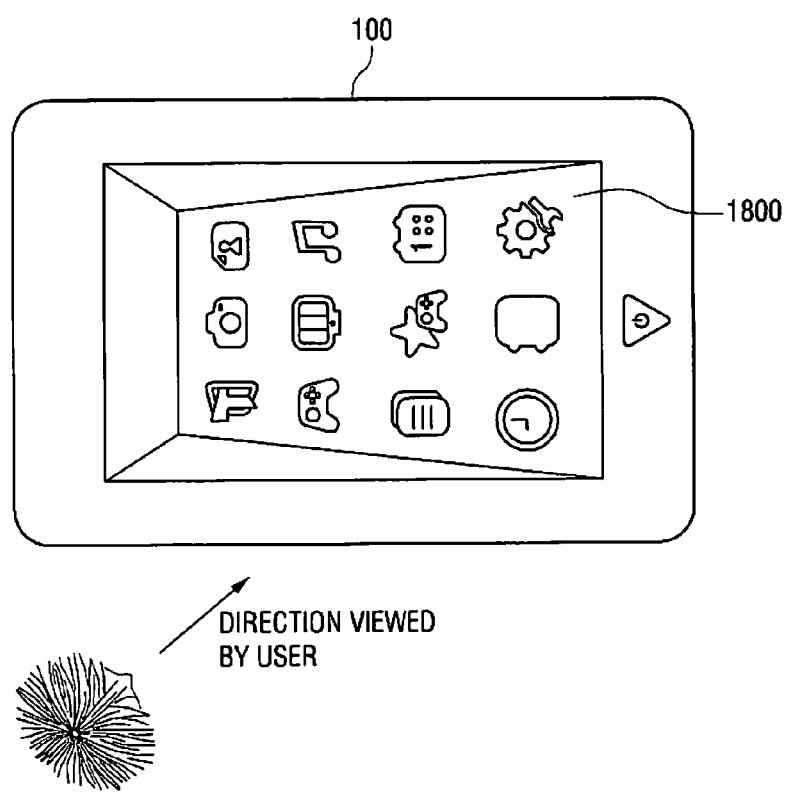

FIGS. 18A and 18B illustrate the process in which the mobile phone 100 adjusts the direction in which the 3D GUI is displayed, according to the direction viewed by the user.

The mobile phone 100 detects the direction viewed by the user, to adjust the displaying of the 3D GUI to correspond to the direction viewed by the user. Specifically, the mobile phone 100 perceives the user's face using a camera (not illustrated) attached on the front of the phone 100, and detects the location of the user's face. The mobile phone 100 includes the acceleration sensor and the gyro sensor, and using the accelerator sensor and the gyro sensor, detects the posture of the mobile phone 100. The mobile phone then detects the direction viewed by the user, using the information regarding the user's face and the posture information of the mobile phone 100. The mobile phone 100 adjusts the direction of the 3D GUI so that the direction viewed by the user is in a perpendicular relationship with the specific face 1800 of the 3D GUI on which the main screen is displayed.

FIG. 18A illustrates the screen of the mobile phone 100 viewed by the user from the right direction. Referring to FIG. 18A, if the user views the screen from the right to the left, the mobile phone 100 displays the specific face 1800 at a rightward inclination on the 3D GUI.

FIG. 18B illustrates the screen of the mobile phone 100 viewed by the user from the left direction. Referring to FIG. 18B, if the user views the screen from the left to the right, the mobile phone 100 displays the specific face 1800 at a leftward inclination on the 3D GUI.

Since the mobile phone 100 displays the 3D GUI in accordance with the direction viewed by the user who is watching the mobile phone 100 from a side, the user experiences an increased convenience in using the 3D GUI. Meanwhile, although the examples explained above employ the mobile phone 100 as the display apparatus, this is written only for illustrative purposes. Accordingly, any display apparatus can be implemented according to an embodiment of the present invention, provided that the display apparatus is capable of providing a GUI. For example, a MP3 player, a Point to MultiPoint (PMP), a personal data assistant, a netbook or a notebook may be implemented.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for providing a Graphic User Interface (GUI) of a display apparatus, the method comprising:
   displaying a plurality of objects on a display on a screen of the display apparatus;
   if a first object among the plurality of objects displayed on the screen is selected, displaying a first execution screen correspond to the first object on the screen, wherein the first execution screen displays a first application corresponding to the first object that is currently executed by the display apparatus;
   if a first slanting motion is input, displaying the plurality of objects displayed on the screen, on a specific face of a Three Dimensional (3D) GUI constructed to display separate faces depicting the specific face and at least one of adjoining faces contacting an edge of the specific face that correspond to the first slanting motion;
   in response to the selection of the first object while the first slanting motion is input:
      simultaneously displaying the plurality of objects on the at least one of the adjoining faces and the execution screen corresponding to the selected object on the specific face while the first slanting motion is maintained; and
      if a second object among the plurality of objects displayed on the at least one of the adjoining faces is selected, in response to the selection of the second object while the first slanting motion is maintained, displaying a second execution screen corresponding to the second object on the specific face,
      wherein the second execution screen displays a second application corresponding to the second object that is currently executed by the displays apparatus.

2. The method as claimed in claim 1, wherein the specific face is one face of a rectangular parallelepiped, and the at least one of the adjoining faces is an upward face, a downward face, a leftward face, and a rightward face which adjoin four edges of the specific face.

3. The method as claimed in claim 2, wherein if the first slanting motion is input the displaying comprises displaying the 3D GUI at an inclination in a direction of the first slanting motion, to display at least one of the upward, downward, leftward and rightward faces that corresponds to the direction of the first slanting motion.

4. The method as claimed in claim 3, wherein an angle of slanting of the slanted 3D GUI corresponds to an angle of slanting of the display apparatus.

5. The method as claimed in claim 2, wherein if the first slanting motion is input the displaying comprises:
   inputting a start manipulation, indicating an initiation of a manipulation by the first slanting motion;
   detecting the first slanting motion of the display apparatus; and
   displaying the at least one of the upward, downward, leftward and rightward faces that corresponds to a direction of the first slanting motion.

6. The method as claimed in claim 5, wherein inputting the start manipulation comprises inputting by pressing a specific button provided on the display apparatus.

7. The method as claimed in claim 2, wherein if the first slanting motion is input the displaying comprises displaying the at least one of the upward, downward, leftward and rightward faces that corresponds to a direction of the first slanting motion, if the first slanting motion is input in one of upward, downward, leftward and rightward directions with reference to the display of the display apparatus.

8. The method as claimed in claim 2, wherein if the first slanting motion is input the displaying comprises displaying two of the upward, downward, leftward and rightward and faces that correspond to a direction of the first slanting motion, if the first slanting motion is input in one of diagonal directions including left-upward, left-downward, right-upward and right-downward directions with reference to the display of the display apparatus.

9. The method as claimed in claim 1, wherein the plurality of objects comprise icons having shortcut functions with respect to functions provided by the display apparatus.

10. A display apparatus comprising:
   a Graphic User Interface (GUI) generating unit which generates a Three Dimensional (3D) GUI;
   a display unit which displays the 3D GUI; and
   a control unit which:
   controls the display unit to display a plurality of objects, the plurality of objects displayed on a screen on the display unit of the display apparatus,
   if a first object among the plurality of objects displayed on the screen is selected, controls the display unit to display a first execution screen corresponding to the first object on the screen, wherein the first execution screen displays first application corresponding to the first object that is currently executed by the display apparatus,
   if a first slanting motion is input, controls the display unit to display the plurality of objects displayed on the screen, on a specific face of the 3D GUI constructed to display separate faces depicting the specific face and at least one of the adjoining faces contacting an edge of the specific face that corresponds to the first slanting motion,
   in response to the selection of the first object while the first slanting motion is input:
      controls the display unit to simultaneously display the plurality of objects on the at least one of the adjoining faces and the execution screen corresponding to the selected object on the specific face while the first slanting motion is maintained, and
      if a second object among the plurality of objects displayed on the at least one of the adjoining faces is selected, in response to the selection of the second object while the first slanting motion is maintained, controls the display unit to display a second execution screen corresponding to the second object on the specific face, wherein the second execution screen displays a second application corresponding to the second object that is currently executed by the display apparatus.

11. The display apparatus as claimed in claim 10, wherein the specific face is one face of a rectangular parallelepiped, and the at least one of the adjoining faces is an upward face, a downward face, a leftward face, and a rightward face which adjoin four edges of the specific face.

12. The display apparatus as claimed in claim 11, wherein if the first slanting motion is input the control unit controls the display unit to display the 3D GUI at an inclination in a direction of the first slanting motion, to display at least one of the upward, downward, leftward and rightward faces that corresponds to the direction of the first slanting motion.

13. The apparatus as claimed in claim 12, wherein an angle of slanting of the slanted 3D GUI corresponds to an angle of slanting of the display apparatus.

14. The apparatus as claimed in claim 11, wherein the control unit controls the display unit to display, if a start manipulation is inputted, indicating an initiation of a manipulation by the first slanting motion, according to a direction of the first slanting motion as detected by a motion detecting unit, the at least one of the upward, downward, leftward and rightward faces that corresponds to the direction of the first slanting motion.

15. The display apparatus as claimed in claim 14, wherein the control unit detects a pressing on a specific button provided on the display apparatus as a start of the manipulation.

16. The display apparatus as claimed in claim 11, wherein the control unit controls the display unit to display the at least one of the upward, downward, leftward and rightward faces that corresponds to a direction of the first slanting motion, if the first slanting motion is input in one of upward, downward, leftward and rightward directions with reference to the display unit of the display apparatus.

17. The display apparatus as claimed in claim 11, wherein the control unit controls the display unit to display two of the upward, downward, leftward and rightward faces that correspond to a direction of a second slanting, if the second slanting motion is input in one of diagonal directions including left-upward, left-downward, right-upward and right-downward directions with reference to the display unit of the display apparatus.

18. The display apparatus as claimed in claim 10, wherein the plurality of objects comprise icons having shortcut functions with respect to functions provided by the display apparatus.

19. A method for providing a Graphic User Interface (GUI) of a display apparatus for detecting a motion, the method comprising:

displaying a plurality of objects on a display on a screen of the display apparatus;

receiving touch input selecting a first object among the plurality of objects displayed on the screen;

displaying a first execution screen corresponding to the first object on the screen, wherein the first execution screen displays a first application corresponding to the first object that is currently executed by the display apparatus;

if a first slanting motion is input, displaying the plurality of objects displayed on the screen, on a specific face of a Three Dimensional (3D) GUI constructed to display separate faces depicting the specific face and at least one of adjoining faces contacting an edge of the specific face that corresponds to the first slanting motion;

in response to the selection of the first object while the first slanting motion is input:

simultaneously displaying the plurality of objects on the at least one of the adjoining faces and the execution screen corresponding to the selected object on the specific face while the first slanting motion is maintained;

receiving touch input selecting a second object among of the plurality of objects displayed on the at least one of the adjoining faces; and in response to the selection of the second object while the first slanting motion is maintained, displaying a second execution screen corresponding to the second object on the specific face, wherein the second execution screen displays a second application corresponding to the second object that is currently executed by the display apparatus.

* * * * *